United States Patent
Duffy et al.

(10) Patent No.: US 11,941,555 B2
(45) Date of Patent: Mar. 26, 2024

(54) SYSTEM AND METHOD FOR FULFILLING WORK TASKS VIA MODULAR AUTONOMOUS VEHICLES

(71) Applicant: PANASONIC INTELLECTUAL PROPERTY MANAGEMENT CO., LTD., Osaka (JP)

(72) Inventors: David Michael Duffy, Zurich (CH); Matthew John Lawrenson, Chesterfield, MO (US); Jan Jasper van den BERG, London (GB); Kenji Sugihara, Tokyo (JP); Sadako Yamagata, Kanagawa (JP); Akihisa Kawasaki, Kanagawa (JP); Koichi Nakahara, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 512 days.

(21) Appl. No.: 17/201,158

(22) Filed: Mar. 15, 2021

(65) Prior Publication Data

US 2021/0201230 A1 Jul. 1, 2021

Related U.S. Application Data

(63) Continuation of application No. PCT/JP2019/037398, filed on Sep. 24, 2019.
(Continued)

(51) Int. Cl.
  *G06Q 10/0631* (2023.01)
  *G05D 1/00* (2006.01)
  (Continued)

(52) U.S. Cl.
  CPC ..... *G06Q 10/06311* (2013.01); *G05D 1/0276* (2013.01); *B60P 3/0257* (2013.01)

(58) Field of Classification Search
  None
  See application file for complete search history.

(56) References Cited

U.S. PATENT DOCUMENTS

2014/0111332 A1   4/2014   Przybylko et al.
2017/0147887 A1*  5/2017   Be ................ G06V 20/52
(Continued)

FOREIGN PATENT DOCUMENTS

DE   102005041449 A1 * 10/2006   ............. B60N 3/10
EP   2296071           3/2011
(Continued)

OTHER PUBLICATIONS

Hassler, Chelsea Adelaine, "Say Hello to Uber Express Pool, the Quickest (and Cheapest) New Option for Your Commute," Feb. 27, 2018, Popsugar, <https://www.popsugar.com/news/what-uber-express-pool-44605371> (Year: 2018).*

(Continued)

*Primary Examiner* — Aniss Chad
*Assistant Examiner* — Madison R Hughes
(74) *Attorney, Agent, or Firm* — GREENBLUM & BERNSTEIN, P.L.C.

(57) ABSTRACT

A method for fulfilling a work task request using a modular autonomous vehicle is provided. The method includes transmitting a work task request specifying a work request to be performed by the modular autonomous vehicle, and identifying equipment required for performing the work task request. Once the work task request is stored at a server, the method further includes identifying information of the equipment required for performing the work task request, and determining whether equipment of the modular autonomous vehicle corresponds to the equipment required for assigning the work task to the modular autonomous vehicle. Method also includes, upon receiving in-cabin sensing data, (Continued)

assigning or denying the work task to the modular autonomous vehicle for performance of the work task.

19 Claims, 19 Drawing Sheets

Related U.S. Application Data

(60) Provisional application No. 62/735,339, filed on Sep. 24, 2018.

(51) Int. Cl.
*B60P 3/025* (2006.01)
*G06Q 10/00* (2023.01)

(56) References Cited

U.S. PATENT DOCUMENTS

| | | | |
|---|---|---|---|
| 2017/0169366 A1* | 6/2017 | Klein | G06Q 10/025 |
| 2018/0074499 A1 | 3/2018 | Cantrell et al. | |
| 2018/0074518 A1 | 3/2018 | Cantrell et al. | |
| 2018/0120169 A1* | 5/2018 | Jackson | G06Q 10/00 |
| 2018/0211218 A1* | 7/2018 | Berdinis | G06Q 10/08355 |
| 2019/0047356 A1* | 2/2019 | Ferguson | G06Q 10/0837 |
| 2019/0227554 A1 | 7/2019 | Cantrell et al. | |
| 2019/0272500 A1* | 9/2019 | Haque | G06Q 50/30 |

FOREIGN PATENT DOCUMENTS

| | | |
|---|---|---|
| JP | 2014-097785 | 5/2014 |
| JP | 2017-037605 | 2/2017 |
| JP | 2017-124646 | 7/2017 |
| WO | 2017/156586 | 9/2017 |

OTHER PUBLICATIONS

Office Action from Japan Patent Office (JPO) in Japanese Patent Appl. No. 2021-502630, dated Feb. 22, 2022, together with an English language translation.

International Search Report (ISR) from International Searching Authority (European Patent Office) in International Pat. Appl. No. PCT/JP2019/037398, dated Jan. 10, 2020.

Written Opinion (WO) from International Searching Authority (European Patent Office) in International Pat. Appl. No. PCT/JP2019/037398, dated Jan. 10, 2020.

* cited by examiner

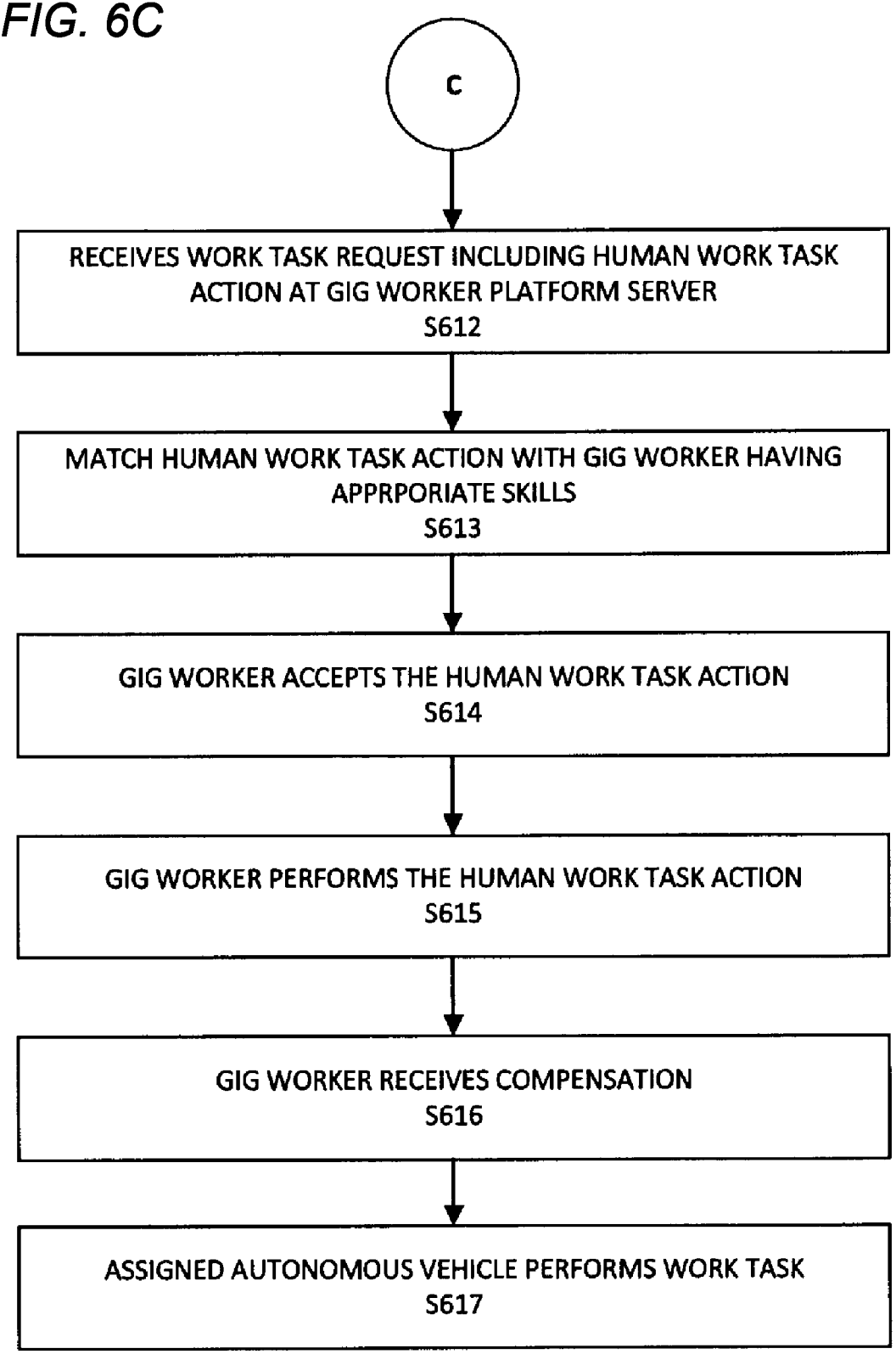

SYSTEM AND METHOD FOR FULFILLING WORK TASKS VIA MODULAR AUTONOMOUS VEHICLES

CROSS-REFERENCE TO RELATED APPLICATIONS

This application is a continuation of PCT International Patent Application No. PCT/JP2019/037398 filed on Sep. 24, 2019, which claims the benefit of priority of U.S. Provisional Application No. 62/735,339 filed on Sep. 24, 2018, the entire contents of which are incorporated herein by reference.

FIELD

The present disclosure relates to performing impromptu tasks via an autonomous vehicle.

BACKGROUND

The gig economy for humans is an employment market based on short-term or freelance contracts. Within this system, the employed person does not have a long-term agreement with the employer, instead performing tasks as agreed on a short-term basis.

Product concept demonstrations from organizations have presented modular type vehicles, where such modularity may give rise to vehicles that can perform different functions, such as a vehicle that may provide transportation of humans or goods, a retail location, a restaurant dining facility or a hotel bedroom. Further, the modularity may also give rise to vehicles that can alter their cabin arrangement, either via a change of dynamic furniture (e.g., screens, displays, etc.) or by complete change of cabin.

SUMMARY

A system to enable autonomous vehicles to take part in a gig economy, whereby vehicles may complete tasks on behalf of a (temporary) employer, and that employer may verify that the vehicle is capable of the task using its various on-board technologies.

The gig economy is an increasingly popular method for human workers to gain income, but the expanding abilities of autonomous vehicles means that in the future, opportunities may arise for such vehicles to complete jobs in a similar manner. Designed-in modularity of autonomous vehicles may increase the capabilities of a vehicle by allowing it to carry out multiple functions. However, variability in these capabilities between vehicles means that not all will be capable of carrying out a given task, and some manual tasks will still require human input.

Non-limiting aspects of the present disclosure provides a system whereby an autonomous vehicle may be algorithmically interrogated to ensure that the autonomous vehicle is capable of performing a particular gig-based task. Further, non-limiting aspects of the present disclosure also enables human assistance to be provided via the same gig-based system in combination with transportation, and also enables a vehicle to complete both a gig-based job and passenger transportation simultaneously by offering flexible fares dependent on arrival time.

According to an aspect of the present disclosure, a system for generating and fulfilling a work task using a modular autonomous vehicle is provided. The system includes an entity that advertises a work task on a platform that is accessible to one or more autonomous vehicles. In an example, work tasks could include a delivering a package or offering the autonomous vehicle cabin as a restaurant or hotel room. The system further includes an autonomous vehicle that applies to complete the work task and the platform verifies that the autonomous vehicle possesses appropriate equipment to complete it. In an example, the platform requests information and/or sensor and camera data from the autonomous vehicle to make the verification. Further, the work task is assigned to the autonomous vehicle, which completes the task and receives some reward for doing so.

Non-limiting aspects of the present disclosure provide a platform to match the capabilities of a vehicle (or vehicle sub-components) with temporary jobs. In an example, vehicle capability—job matching includes a technical assessment of the vehicle, or an assessment of the vehicle's components, equipment and abilities.

Non-limiting aspects of the present disclosure also provide an algorithm and system to create, issue and assess tasks which may be used to determine a vehicle's suitability for a particular job.

Non-limiting aspects of the present disclosure provide an algorithm to optimise the potential revenue received by an autonomous vehicle from both temporary jobs and transporting passengers, producing a fare where the passenger's fare is adjusted for flexibility or tolerance of arrival time.

Non-limiting aspects of the present disclosure provide a combination of transport services and the human gig economy, whereby humans can receive a reward for performing work during their journey.

Non-limiting aspects of the present disclosure provide a combination of human and autonomous vehicle gig work, whereby the abilities of both may be utilised to complete tasks which may not be achieved individually. This includes an assessment of the human's contribution via video and/or sensors to determine whether work has been carried out to a given standard.

BRIEF DESCRIPTION OF DRAWINGS

FIG. 6C shows the other part of the method for generating and fulling a work request via a modular autonomous vehicle, according to an aspect of the present disclosure, according to aspects of the present disclosure.

DETAILED DESCRIPTION

Figure 1:
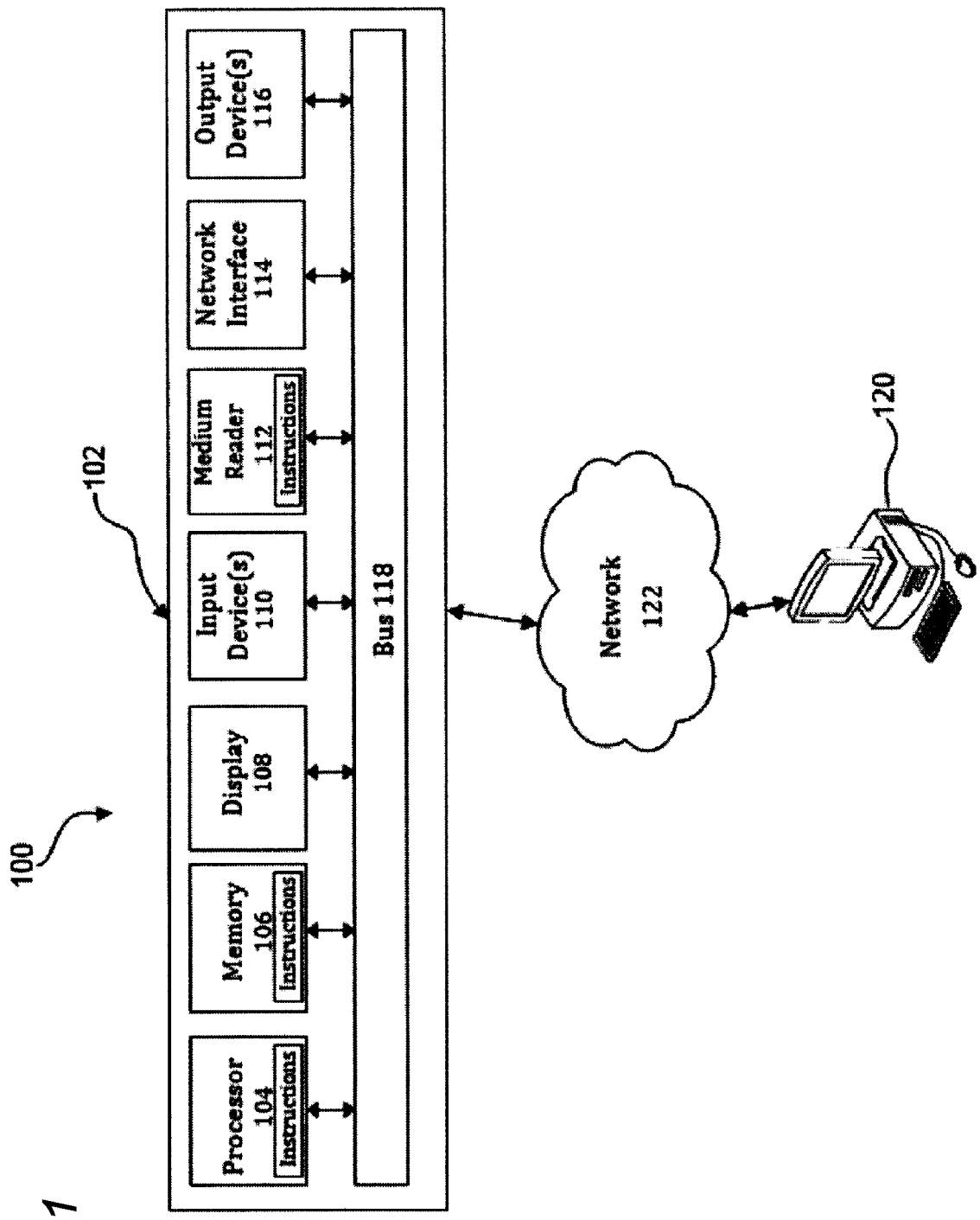
FIG. 1 shows an exemplary general computer system utilized for requesting and fulfilling a work task request, according to an aspect of the present disclosure.

In view of the foregoing, the present disclosure, through one or more of its various aspects, embodiments and/or specific features or sub-components, is thus intended to bring out one or more of the advantages as specifically noted below.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

FIG. 1 is an exemplary computer system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or subsystems that individually or jointly execute instructions or perform functions. The term "system" shall be taken throughout the present disclosure to include any collection of systems or subsystems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read anyone or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth®, Zigbee®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
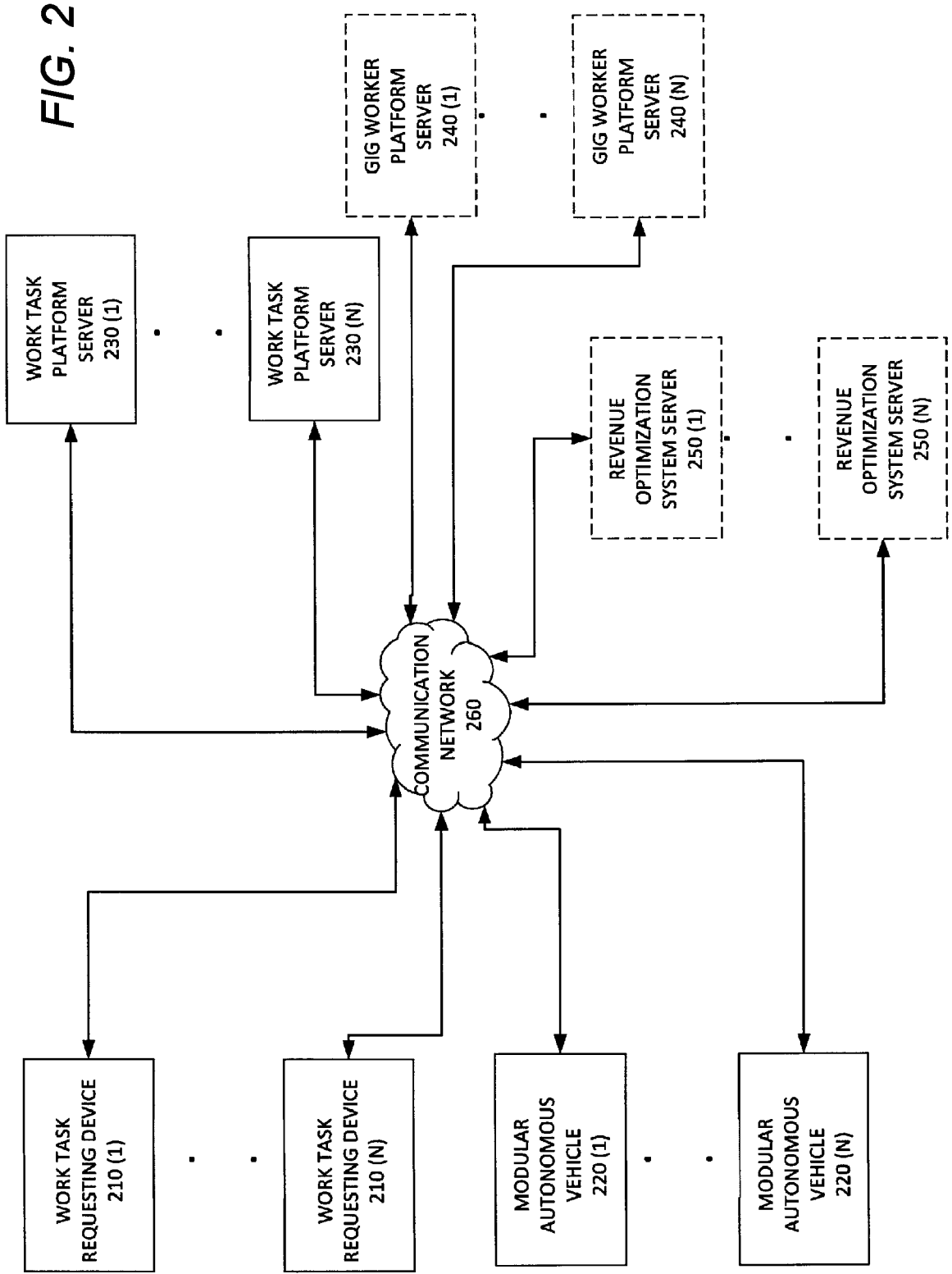
FIG. 2 shows an exemplary network environment for generating and fulfilling a work task request via a modular autonomous vehicle, according to an aspect of the present disclosure.

FIG. 2 shows an exemplary network environment for generating and fulfilling a work task request via a modular autonomous vehicle, according to an aspect of the present disclosure.

Referring to FIG. 2, a schematic of an exemplary network environment is illustrated. In an exemplary embodiment, a work task request generation/fulfilment framework is executable on a networked computer platform.

In the network environment of FIG. 2, a plurality of work task requesting devices 210(1)-210(N), a plurality of modular autonomous vehicles 220(1)-220(N), a plurality of work task platform servers 230(1)-230(N), a plurality of gig worker platform servers 240(1)-240(N) and a plurality of revenue optimization system servers 250(1)-250(N) may communicate via communication network(s) 260.

A communication interface of one or more of the work task requesting devices 210(1)-210(N), such as the network interface 114 of the computer system 102 of FIG. 1, operatively couples and communicates between work task requesting devices 210(1)-210(N), the modular autonomous vehicles 220(1)-220(N), the work task platform servers 230(1)-230(N), the gig worker platform servers 240(1)-240(N) and/or the revenue optimization system servers 250(1)-250(N), which are all coupled together by the communication network(s) 260, although other types and/or numbers of communication networks or systems with other types and/or numbers of connections and/or configurations to other devices and/or elements may also be used.

The communication network(s) 260 may be the same or similar to the network 122 as described with respect to FIG. 1, although the work task requesting devices 210(1)-210(N), computers of the modular autonomous vehicles 220(1)-220(N), the work task platform servers 230(1)-230(N), the gig worker platform servers 240(1)-240(N) and/or the revenue optimization system servers 250(1)-250(N) may be coupled together via other topologies. Additionally, the network environment may include other network devices such as one or more routers and/or switches, for example, which are well known in the art and thus will not be described herein.

By way of example only, the communication network(s) 260 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 260 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

One or more among the work task platform servers 230(1)-230(N), the gig worker platform servers 240(1)-240(N) and/or the revenue optimization system servers 250(1)-250(N) may be the same or similar to the computer system 102 or the computer device 120 as described with respect to FIG. 1, including any features or combination of features described with respect thereto. For example, any of the work task platform servers 230(1)-230(N), the gig worker platform servers 240(1)-240(N), and/or the revenue optimization system servers 250(1)-250(N) may include, among other features, one or more processors, a memory, and a communication interface, which are coupled together by a bus or other communication link, although other numbers and/or types of network devices may be used. Further, any of the work task platform servers 230(1)-230(N), the gig worker platform servers 240(1)-240(N) and/or the revenue optimization system servers 250(1)-250(N) in this example may process requests received from a client or server device via the communication network(s) 260 according to the HTTP-based and/or JavaScript Object Notation (JSON) protocol, for example, although other protocols may also be used.

In an example, one or more among the work task platform servers 230(1)-230(N), the gig worker platform servers 240(1)-240(N) and/or the revenue optimization system servers 250(1)-250(N) may be hardware or software or may represent a system with multiple servers in a pool, which may include internal or external networks.

Although the work task platform servers 230(1)-230(N), the gig worker platform servers 240(1)-240(N) and/or the revenue optimization system servers 250(1)-250(N) are illustrated as single devices, one or more actions of each of the work task platform servers 230(1)-230(N), the gig worker platform servers 240(1)-240(N) and/or the revenue optimization system servers 250(1)-250(N) may be distributed across one or more distinct network computing devices that together comprise one or more of the work task platform servers 230(1)-230(N), the gig worker platform servers 240(1)-240(N) and/or the revenue optimization system servers 250(1)-250(N). Moreover, the work task platform servers 230(1)-230(N), the gig worker platform servers 240(1)-240(N) and/or the revenue optimization system servers 250(1)-250(N) are not limited to a particular configuration. Thus, the work task platform servers 230(1)-230(N), the gig worker platform servers 240(1)-240(N) and/or the revenue optimization system servers 250(1)-250(N) may contain a plurality of network computing devices that operate using a master/slave approach, whereby one of the network computing devices of the work task platform servers 230(1)-230(N), the gig worker platform servers 240(1)-240(N) and/or the revenue optimization system servers 250(1)-250(N) operates to manage and/or otherwise coordinate operations of the other network computing devices.

The work task platform servers 230(1)-230(N), the gig worker platform servers 240(1)-240(N) and/or the revenue optimization system servers 250(1)-250(N) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The work task requesting devices 210(1)-210(N) may also be the same or similar to the computer system 102 or the computer device 120 as described with respect to FIG. 1, including any features or combination of features described with respect thereto. For example, the work task requesting devices 210(1)-210(N) in this example may include any type of computing device that can facilitate the execution of a web application or analysis that relates to an API. Accordingly, the work task requesting devices 210(1)-210(N) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one work task requesting device 210 is a wireless mobile communication device, i.e., a smart phone.

The work task requesting devices 210(1)-210(N) may run interface applications, such as standard web browsers or standalone client applications, which may provide an interface to communicate with one or more of the modular autonomous vehicles 220(1)-220(N), one or more of the work task platform servers 230(1)-230(N), one or more of the gig platform servers 240(1)-240(N) and/or one or more of the revenue optimization servers 250(1)-250(N) via the communication network(s) 260 in order to communicate user requests. The work task requesting devices 210(1)-210(N) may further include, among other features, a display device, such as a display screen or touchscreen, and/or an input device, such as a keyboard, for example.

Although the exemplary network environment with the work task requesting devices 210(1)-210(N), the modular autonomous vehicles 220(1)-220(N), the work task platform servers 230(1)-230(N), the gig platform servers 240(1)-240(N), the revenue optimization servers 250(1)-250(N) and the communication network(s) 260 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as the work task requesting devices 210(1)-210(N), the work task platform servers 230(1)-230(N), the gig platform servers 240(1)-240(N), or the revenue optimization servers 250(1)-250(N), for example, may be configured to operate as virtual instances on the same physical machine. In other words, one or more of the work task requesting devices 210(1)-210(N), the work task platform servers 230(1)-230(N), the gig platform servers 240(1)-240(N), or the revenue optimization servers 250(1)-250(N) may operate on the same physical device rather than as separate devices communicating through communication network(s) 260.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
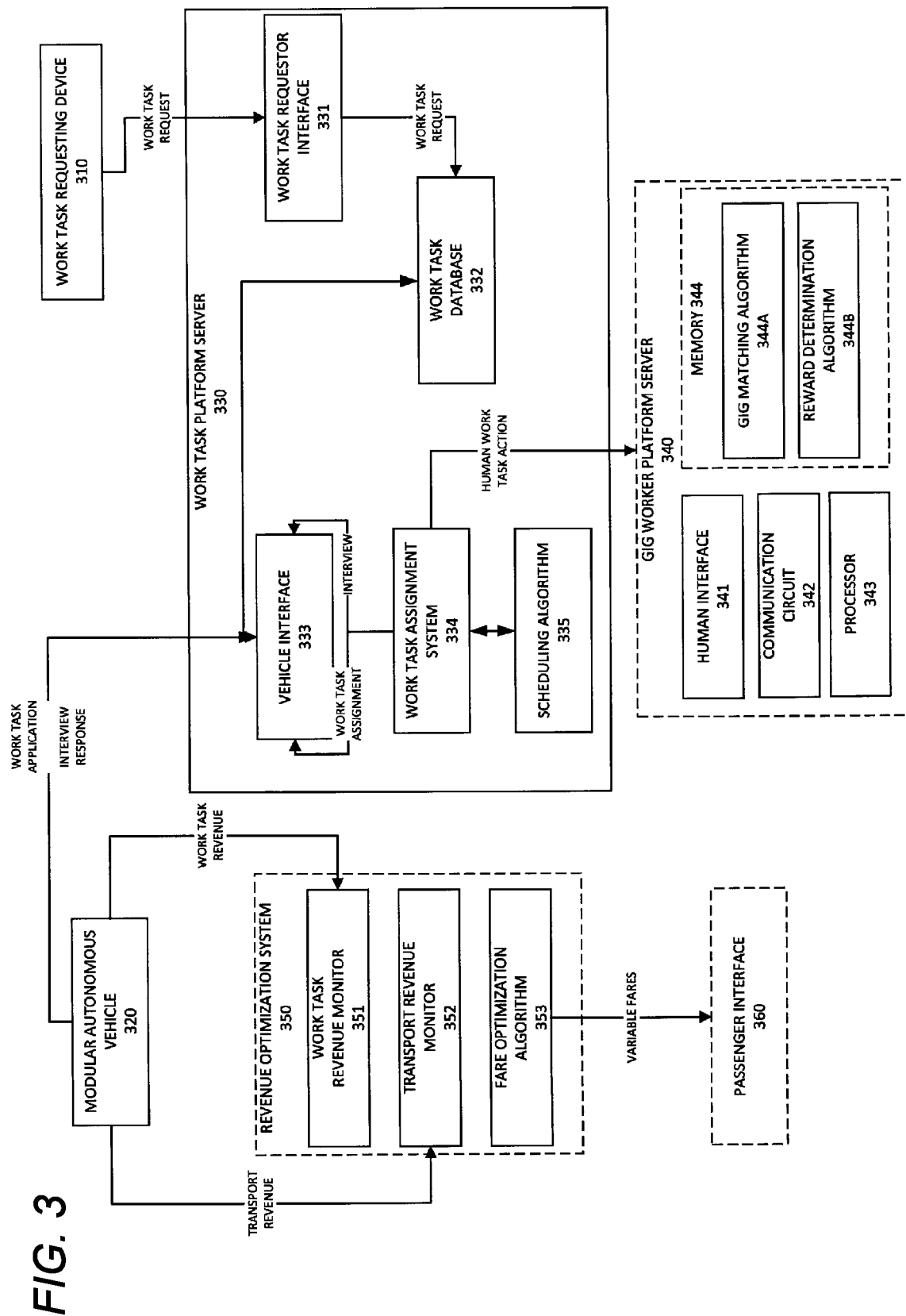
FIG. 3 shows an exemplary system environment for generating and fulfilling a work task request via a modular autonomous vehicle, according to an aspect of the present disclosure.

FIG. 3 shows an exemplary system environment for generating and fulfilling a work task request via a modular autonomous vehicle, according to an aspect of the present disclosure.

System 300 includes a work task requesting device 310, a modular autonomous vehicle 320, and a work task platform server 330. The system 300 optionally further includes a gig worker platform server 340 and/or a revenue optimization system 350.

The work task requesting device 310 may be a portable computing device with communication capabilities that may be used by an entity, either a person, a business or an organization (e.g., restaurants, coffee shops, e-commerce traders, delivery service providers or hotels) (herein after referred to as a work task requestor). For example, the work task requesting device 310 may be a smart phone, a wearable smart device (e.g., smart watch), other portable computing devices having communication capabilities, a stationary computer, a kiosk and the like. According to aspects of the present disclosure, the work task requesting device 310 may have a configuration of a work task requesting device 400 illustrated in FIG. 4. More specifically, the work task requesting device 400 includes a user interface 410, a location sensor 420 (e.g., GPS), a processor 430, a memory 440, a communication circuit 450 and a routing system 460 (which will be discussed in more detail below).

The work task requesting device 310 may be used to submit a work task request to be fulfilled by the modular autonomous vehicle 320. In an example, the work task request may be a request for one or more modular autonomous vehicles to perform the requested work task, with or without human assistance. The work task request may be a specific request requested to be performed or completed by the modular autonomous vehicle 320. In an example, the work task requestor may submit a work task request, via the work task requesting device 310. The submitted work task may be advertised to be completed by an entity outside of the work task requestor's organization. According to aspects of the present disclosure, the work task may be performed or completed by an autonomous vehicle (modular or regular), a subsystem of the autonomous vehicle, and/or one or more human workers (e.g., gig workers) in combination with the autonomous vehicle or its subsystem.

In an example, the work task requesting device 310 may generate a job posting to be submitted as the work task request. The job posting or the work task request may describe the work task in various detail. In an example, the work task may include requirements of an autonomous vehicle, logistical details, revenue, and/or gig worker requirements (if applicable). The requirements of the autonomous vehicle may specify a size of the autonomous vehicle or its cabin, technical capabilities of the cabin, and/or features and infrastructure available within it.

For example, the requirements of the autonomous vehicle may require bedding, cooking devices (e.g., stove, fryer, oven and etc.), coffee making machines, office furniture, meeting room settings (e.g., for conducting interviews or business meetings), in-cabin cameras or the like. Further, features specified in the requirements of the autonomous vehicle may not be specific requirements of the work task request, and may include features to be used by later systems (e.g., work task assignment system 334) to determine suitability of the modular autonomous vehicle 320 to complete the work task.

In an example, the logistical details specified in the job posting or the work task request may include, without limitation, a meeting location, arrival time, task duration or the like.

Also, in an example, the revenue information specified in the job posting or the work task request may include potential revenue that can be earned by the autonomous vehicle by completing the work task. The revenue information may be described as a tiered system of earnings, which may vary with time taken to complete the task and/or the standard to which the task is to be completed.

In addition, the gig worker requirements may include details on any specific skills (e.g., barista) required by a gig worker performing the work task with the autonomous vehicle.

More specifically, work requestor may not explicitly specify one or more of the features listed in the requirements of the autonomous vehicle.

The modular autonomous vehicle 320 may be a vehicle with varying levels of autonomous capabilities (e.g., partial or full). The modular autonomous vehicle 320 may be capable of moving and taking independent actions within a location. The modular autonomous vehicle 320 may have some capacity to be modified or configured in order to alter the use of its various spaces (e.g., cabin) or surfaces (e.g., screens, exterior paintwork). For example, the module autonomous vehicle 320 may include interchangeable components. The interchangeable components may include, without limitations, various fixtures, equipment, power system, wheels, chassis, and body of the vehicle itself. The power system, wheels, suspensions, various sensors may be combined as a single module. However, aspects of the present disclosure are not limited thereto, such that other combination of components may be combined as a single component, which may be combined with other interchangeable components.

Level of modifications of the modular autonomous vehicle 320 may be varied. For example, modifications may specify basic level changes, such as changes to digital media displayed on screens within the cabin. Modifications may further specify intermediate level changes, such as layout changes within a fixed cabin of the modular autonomous vehicle 320 to serve multiple purposes (e.g., folding or removable tables or storage units). Modifications may further require high level of changes, which may include complete exchange of one modular cabin for another. For example, a first modular cabin with food storage capabilities may be changed with a second modular cabin containing a bed. More specifically, the second modular cabin may be attached to a driving part (e.g., powertrain, chassis and etc.) of the modular autonomous vehicle 320.

According to aspects of the present disclosure, various properties and capabilities of the modular autonomous vehicle 320 may be described by certain metrics or properties (hereinafter referred to as AV properties). The AV properties may include, for example, a size of a cabin, a number of modifiable digital display media (e.g., screens) within the cabin, and availability of certain features (e.g., refrigeration space).

The work task platform server 330 may be a platform for managing work task requests transmitted by one or more work task requesting devices 310. Management of work task requests may include receiving, assignment and facilitating completion of work tasks. The work task platform server 330 includes a work task requester interface 331, a work task database 332, a vehicle interface 333, a work task assignment system 334 and a scheduling algorithm 335.

The work task requester interface 331 may be an interface through which a work request from the work task requesting device 310 is received. The work task requester interface 331 may be additionally utilized to monitor work task requests and/or to transfer of revenue associated with completing a work task to the modular autonomous vehicle 320.

The work task requests received through the work task requester interface 331 may be stored in the work task database 332. In an example, the work task database may be a database which work tasks requests generated by the work task requesting devices 310 may be stored.

The work task platform server 330 may communicate with one or more modular autonomous vehicles 320 via the vehicle interface 333. More specifically, the vehicle interface 333 may be an interface through which an autonomous vehicle system or subsystem may interface with the work task platform server 330 for performing various tasks. The various tasks may include, without limitation, viewing of available work tasks to be performed and stored in the work task database 332, submit a request to complete one or more of the available work tasks (hereinafter referred to as work task application), and receiving notification of assignment or rejection in response to the work task application.

The scheduling algorithm 335 may be an algorithm, when executed by a processor, makes one or more determinations based on the estimated time required to complete the work tasks assigned to a target modular autonomous vehicle and known schedule of the modular autonomous vehicle. In an example, the estimated time required and the known schedule may be provided via the vehicle interface 333. Also, in an example, the one or more determinations made by the scheduling algorithm 335 may include, without limitation, (i) time availability to perform a work task request applied for, (ii) optimum schedule for an assigned autonomous vehicle, and, optionally (iii) future demand for the respective work task assigned, availability of autonomous vehicles for type of work or location, availability of gig workers and the like.

The time availability to perform a work task may refer to whether a potential autonomous vehicle has sufficient time to complete the work task request applied for by the potential autonomous vehicle. In the event the scheduling algorithm 335 determines that the potential autonomous vehicle does not have requisite time availability for performing the respective work task, the scheduling algorithm 335 may prevent the potential autonomous vehicle from being assigned to the respective work task request.

The optimum schedule for completion of the work tasks may refer to an optimum schedule for an assigned autonomous vehicle to perform the assigned work task in view of existing schedule of the modular autonomous vehicle 320. In an example, the optimum schedule may take into account time limitations for the assigned work task request.

Further, the scheduling algorithm 335 may include an artificial intelligence (AI) or machine learning component that predicts future requests for certain types of work task requests and/or gig workers based on location, seasonality, day of the week, time of the day and the like. For example, the scheduling algorithm 335 may predict a particular level demand for hotel service and/or morning coffee service near a business district during tax season.

The work task assignment system 334 may be a system through which a work task application from an autonomous vehicle may be assed to determine suitability or compatibility of the respective autonomous vehicle for a relevant work task. The work task assignment system 334 may include multiple subsystems, such as an interview generation algorithm, a capability verification system, and an autonomous vehicle comparison algorithm.

The interview generation algorithm may be an algorithm configured to produce a form of interrogation or interview by which the work task assignment system 334 may determine suitability of an autonomous vehicle to a selected work task. In an example, the interview may be digital or algorithmic. More specifically, the interview may involve a request for information, an inspection of the cabin of the modular autonomous vehicle via in-cabin cameras for cleanliness or digital medial present capabilities, checking of properties of the modular autonomous vehicle using sensors provided on the modular autonomous vehicle. One or more autonomous vehicles receiving the interview from the work task assignment system 334 may provide a response via the vehicle interface. However, an interview may not be generated by the work task assignment system 334 if the scheduling algorithm 335 determines that the temporal scheduling algorithm determines that the temporal availability of the autonomous vehicle is insufficient to complete the work task. In this case, an immediate rejection notification may be issued by the autonomous vehicle by the work task assignment system 334.

The capability verification system may be a system that compares the requirements of the work task (as specified by the work task request transmitted by the work task requesting device 310) with the autonomous vehicle's interview response. The capability verification system may assign the work task to the autonomous vehicle (hereinafter referred to as work task assignment) via the vehicle interface 333 based on whether the autonomous vehicle properties demonstrated in the interview response meet the requirements of the work task request.

The autonomous vehicle comparison algorithm may be an algorithm to compare multiple autonomous vehicles when more than one autonomous vehicle applies to perform or complete a particular work task. In an example, autonomous vehicles may be compared with in terms of their respective autonomous vehicle properties (e.g., cabin size, equipment features, cleanliness, and etc.), locations, know and projected schedules, and any other relevant information that may determine suitability of an autonomous vehicle for a particular work task. Further, if the autonomous vehicle comparison algorithm is unable to find any discernable difference between the multiple autonomous vehicles, the work task may be assigned at random or based on response times by the autonomous vehicles.

The work task platform server 330 may be a network server or a set of network servers interconnected with one another. Further, the work task platform server 330 may be a physical server or a virtual server. The work task requesting device 310, modular autonomous vehicle 320, and the work task platform server 330 may be interconnected with one another over a network. Optionally, the gig worker platform server 340 and/or the revenue optimization system 350 may be connected via a network. In an example, the network may be configured similarly to the communication network 260 of FIG. 2.

According to aspects of the present disclosure, the network may be a communication network, a mobile communication network, a cloud network, other communication networks or a combination thereof. The network may include local area network(s) (LAN(s)) or wide area network(s) (WAN(s)), and can use TCP/IP over Ethernet and industry-standard protocols, although other types and/or numbers of protocols and/or communication networks may be used. Further, the network may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The gig worker platform server 340 includes a human interface 341, a communication circuit 342, a processor 343 and a memory 344. The memory 344 includes a gig matching algorithm 344A and a reward determination algorithm 344B. The gig matching algorithm 344A and/or the reward determination algorithm 344B may be retrieved from the memory 344 and executed by the processor 343.

In an example, the gig worker platform server 340 may be a platform server for managing of gig worker contributions to the work task platform.

The human interface 341 may be an interface through which human gig workers may view and accept aspects of work tasks that cannot be completed by a system of an autonomous vehicle (hereinafter referred to as human work task actions). In an example, the human interface 341 may be implemented by an application and a touch display on a mobile device.

The communication circuit 342 may perform communication with the work task platform server 330. More specifically, the work task assignment system 334 of the communication circuit 342 may transmit human work task action information to the gig worker platform server 340 via the communication circuit 342. In an example, the communication circuit 342 may include a transmitter, a receiver and/or a transceiver.

The gig matching algorithm 344A may be an algorithm configured to match human work task actions with gig workers who may possess appropriate skills to complete them. The gig matching algorithm 344A may be associated with a database storing a list of gig worker skills (hereinafter referred to as gig worker skills database) for each registered gig worker. In an example, a gig worker may be a freelancer with varying skill sets, who may be recruited to perform a portion of a work task requiring human involvement (e.g., a barista for coffee service work task). The gig worker skills database may additionally store other information of each registered gig worker, which may include a description of the worker's skills, commonly travelled routes, preferred human work task actions and the like. In an example, the gig worker information may be supplied by the gig worker via the human interface 341, as part of an online profile created during a registration process.

The reward determination algorithm 344B may be an algorithm designed to calculate a value of compensation that should be awarded to a gig worker on completion of a human work task action. In an example, the gig worker may make a request to an autonomous vehicle for transport between various locations (hereinafter referred to as a transport request). The autonomous vehicle may charge the gig worker a certain amount for the transport request, which the gig worker may reduce by completing a human work task action within the autonomous vehicle during the journey. For example, a gig worker may reduce the transport fee by changing out bed sheets of a modular autonomous vehicle equipped with a bed during transportation. More specifically, the reward determination algorithm 344B may reduce a cost of a transport request based on a calculation of a value of a human work task action performed (e.g., changing out bed sheets), which may take into account various factors. The various factors may include, without limitation, (i) difficulty and/or duration of the human work task action to be performed, and (ii) standard to which the human work task action is to be completed, which may be determined through use of onboard sensors and/or cameras within a cabin of the autonomous vehicle. If the value of the human work task action earned by the gig worker is determined to exceed the cost of the transport request, additional credit may be saved and applied to future transport requests.

The revenue optimization system 350 may be a system to enhance an ability of an autonomous vehicle to take on work tasks by increasing flexibility of an accompanying human traveler's journey through financial incentives. The revenue optimization system 350 may be designed to balance potential income from both transport requests and work task requests, encouraging the traveler or passenger to allow a more flexible arrival or departure time for their journey by reducing the cost of their transport request accordingly.

The revenue optimization system 350 includes a work task revenue monitor 351, a transport revenue monitor 352, and a fare optimization algorithm 353. Further, the revenue optimization system 350 may communicate with a passenger interface 360 to transmit variable fare information.

The work task revenue monitor 351 may be a system that determines potential work task revenue to be gained from completing a work task. In an example, the potential work task revenue may be specified by the work task request. Further, the potential work task revenue may be specified as a fixed revenue or variable revenue.

The transport revenue monitor 352 may be a system that determines potential income from completing a particular transport request (hereinafter referred to as transport revenue). The transport revenue may be calculated based on factors, such as distance to travel, traffic conditions, time of travel and the like.

The fare optimization algorithm 353 may be an algorithm that analyzes a work task request and a transport request to identify any flexibility in their specifications, which may allow both to be completed without conflict. In an example, the fare optimization algorithm 353 may offer financial incentives to a passenger in order to encourage the respective passenger to increase flexibility of the transport request. The financial incentives may be provided in a form of providing dynamic pricing or variable fares. For example, the transport request may have a cost of twenty dollars if the passenger wants to arrive at a target destination within a five minute window, but ten dollars if the passenger is willing to arrive at the target destination within a thirty minute window.

The variable fares may be calculated by the fare optimization algorithm 353 in such a way to allow sufficient time for a work task to be completed around a journey. The variable fares may be communicated to the passenger via the passenger interface 360. In an example, the passenger interface 360 may be implemented by an application on a touch display of a portable device of the passenger.

Although various components are described herein, aspects of the present disclosure are not limited thereto. Further, although singular components are listed in the figures, aspects of the present disclosure are not limited thereto, such that multiple components may be included.

Figure 4:
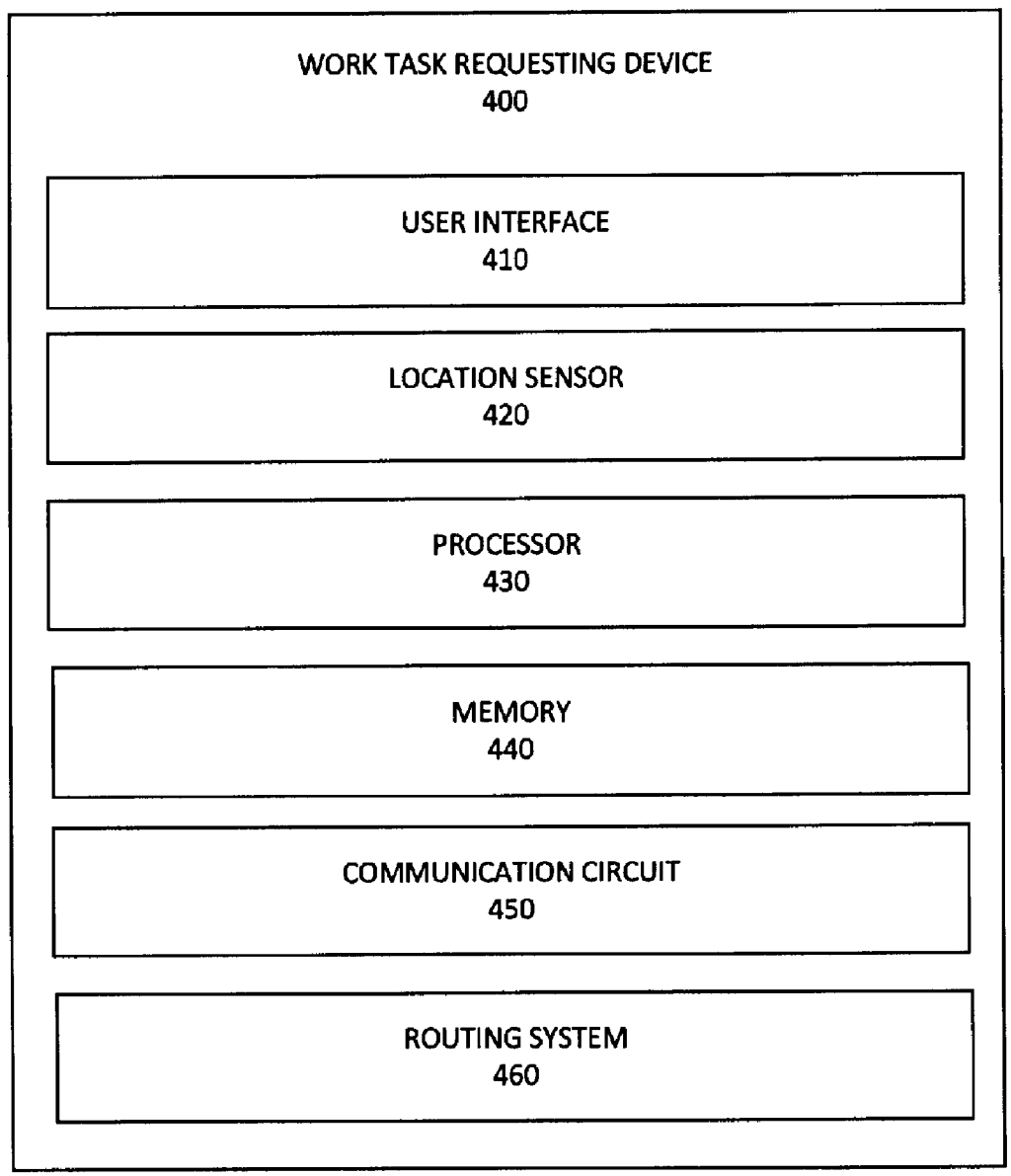
FIG. 4 shows an exemplary work task requesting device, according to an aspect of the present disclosure.

FIG. 4 shows an exemplary work task requesting device, according to an aspect of the present disclosure.

As illustrated in FIG. 4, a work task requesting device 400 includes a user interface 410, a location sensor 420, a processor 430, a memory 440, a communication circuit 450 and a routing system 460. In an example, the work task requesting device 400 may be a smart phone, a wearable smart device (e.g., smart watch), other portable computing devices having communication capabilities, a stationary computer, a kiosk and the like.

In an example, the user interface 410 may include a display interface, which may be provided by a mobile application, for a user to input a work task request, and/or a voice interface. The user interface 410 may be utilized by a user to submit a work task request to be fulfilled by a modular autonomous vehicle. Such work task request may be inputted via an intentional touch, voice, gesture, and the like. However, aspects of the present disclosure are not limited thereto, such that the work task request may be automated. For example, during busy work period (e.g., tax season) the work task requesting device 410 may generate a work task request for a coffee vending service, a food vending service or a hotel service. Further, in such a scenario, the work task requesting device 410 may request a certain number of modular autonomous vehicles to be provided based on past demand for such services.

The user interface 410 may receive an input via a touch, operating of a physical controller (e.g., button, switch, scroll mechanism, knob and etc.), voice, bio signals (e.g., finger print) and the like. In an example, the user interface 410 may include a display, which may be a touch display or a display only, a microphone, and one or more sensors. The one or more sensors may include a bio sensor, which may acquire one or more bio sensors of the user. For example, the bio sensor may include a contact type sensor, such as those that reads a finger print of a user. However, aspects of the present disclosure are not limited thereto, such that the bio sensor may include non-contact based sensors, which may measure human pulse waves in a non-contact manner by using a highly sensitive spread-spectrum millimeter-wave radar or the like, for detecting the heart rate and heart rate fluctuations of the user. In another example, the bio sensor may include a camera, which may determine a heart rate based on change in color of a skin area of the user with respect to time.

The location sensor 420 may indicate a location of the work task requesting device 400. In an example, the location sensor 420 may include a GPS sensor or other sensors providing position information (e.g., longitude and latitude) acquired via a global navigation satellite system (GNSS).

The processor 430 may perform one or more executions in response to an input received via one or more of the routing system 460, the user interface 410 and the communication circuit 450. The processor 430 may provide an output via one or more of the routing system 460, the user interface 410 and the communication circuit 450. The communication circuit 450 may be configured to communicate with a network, a work task platform server and/or a modular action vehicle. In an example, the communication circuit 450 may include a transmitter, a receiver, and/or a transceiver.

In an example, the routing system 460 may be implemented by the location sensor 420, processor 430 and memory 440. The routing system 460 may be used to plan and/or monitor a route of a selected or assigned autonomous vehicle. For example, the routing system 460 may receive a location signal of the selected or assigned autonomous vehicle with respect to the location of the work task requesting device 400 or location at which the work task is to be performed. The routing system 460 may determine a route from the location of the autonomous vehicle based on one or more parameters specified in the work task request. For example, the routing system 460 may determine a route based on fastest time, shortest distance, cost, road conditions (e.g., presence of potholes, loose rocks, and etc.), avoidance of toll roads, scheduled time for performing the work task request and the like. In an example, faster routes with toll roads may incur higher cost to the user requesting the work task request. Further, the routing system 460 may determine a route based on traffic and/or weather information.

The communication circuit 450, although capable of performing communication with a centralized network server, such as the work task platform server, may be also configured to communicate a modular autonomous vehicle through a network, without performing additional communication with the centralized network server. In an example, rather than submitting a work task request to a centralized network server for fulfillment, the communication circuit 450 may broadcast or transmit a work task request directly to one or more modular autonomous vehicles present within a reference distance from the work task requesting device 400 or from a location at which the work task request is to be performed. In an example, the work task request may be broadcasted as a network signal, a network message, a text message, and the like.

Although various components are described herein, aspects of the present disclosure are not limited thereto. Further, although singular components are listed in the figures, aspects of the present disclosure are not limited thereto, such that multiple components may be included.

Figure 5:
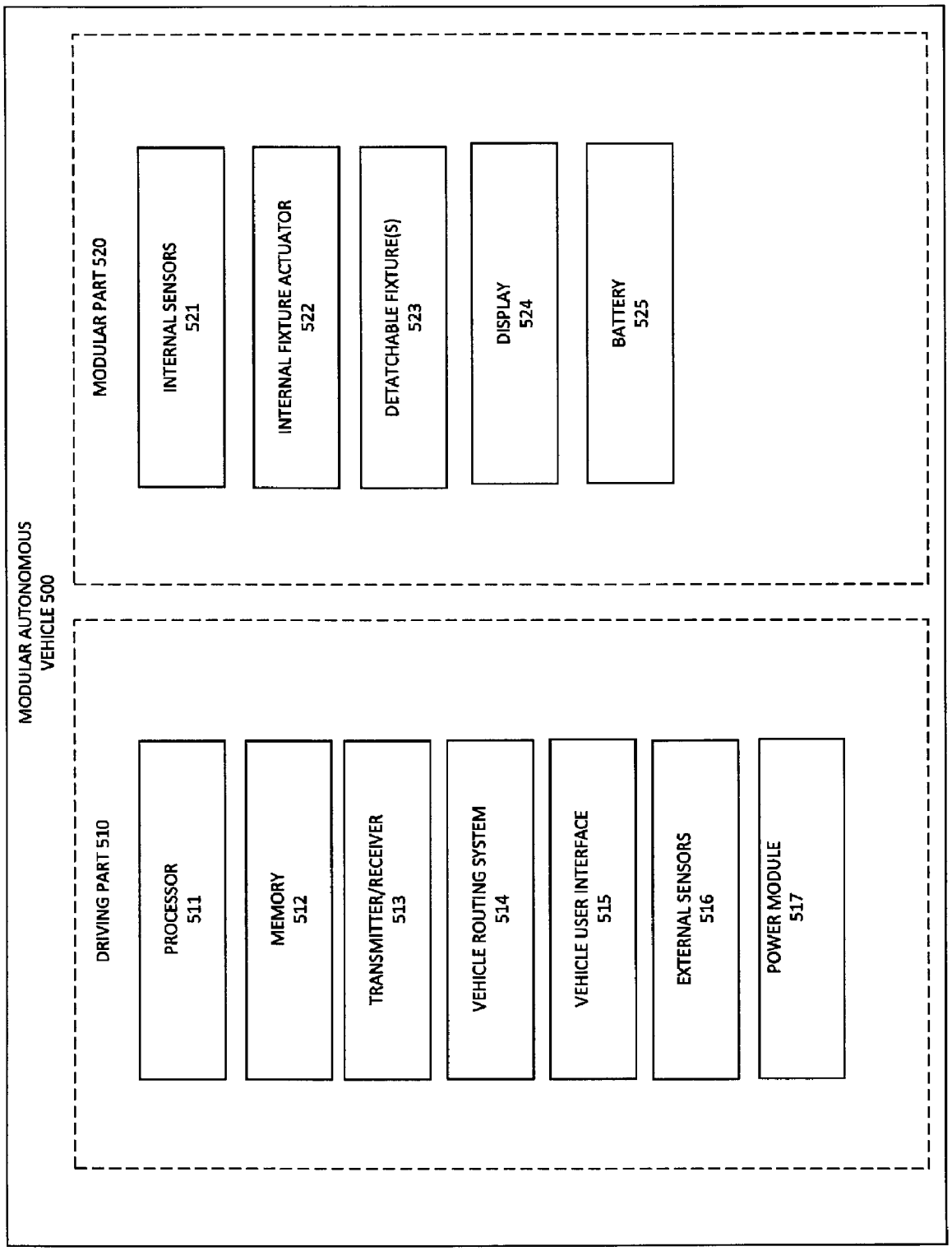
FIG. 5 shows an exemplary modular autonomous vehicle for fulfilling a work task request, according to an aspect of the present disclosure.

FIG. 5 shows an exemplary modular autonomous vehicle for fulfilling a work task request, according to an aspect of the present disclosure.

As illustrated in FIG. 5 includes a modular autonomous vehicle 500. The modular autonomous vehicle 500 includes a driving part 510 and a modular part 520. In an example, the modular part 520 may be attached to the driving part 510 to form a modular autonomous vehicle, and the modular part 520 may be swapped out for another modular part having the same or different equipment. However, aspects of the present disclosure are not limited thereto, such that the modular part 520 may be fixed to the driving part 510.

The driving part 510 includes a processor 511, a memory 512, a transmitter/receiver 513, a vehicle routing system 514, vehicle user interface 515, external sensors 516 and a power module 517. The processor 511 may perform one or more executions in response to an input received via one or more of the transmitter/receiver 513, the vehicle routing system 514, the vehicle user interface 515 and/or external sensor 516. The processor 511 may provide an output via one or more of the transmitter/receiver 513, the vehicle routing system 514 and the vehicle user interface 515. The transmitter/receiver 513 may be configured to communicate with a network.

The memory 512 may store one or more algorithms to be executed by the processor 511. The transmitter/receiver 513 may transmit or receive one or more signals from a work task platform server, other autonomous vehicles and/or a work task requesting device.

The vehicle routing system 514 may be a routing system that plans a route and indicates within the route one or more locations where a work task may be available for fulfilment by the respective modular autonomous vehicle 500. The vehicle routing system 514 may be implemented by a processor, a location sensor (e.g., GPS sensor) and/or a transceiver. The vehicle routing system 514 may be used to plan a route and indicate one or more locations within the planned route at which a work task requested may be executed. In an example, the vehicle routing system 514 may plan multiple routes in relation to or in consideration of other work task requests or transportation requests.

In an example, the vehicle routing system 514 may receive a GPS signal for other communication signals for determining a location of the modular action vehicle 500 and a location at which the requested work task or transportation request is to be performed. The vehicle routing system 514 may determine a route from the location of the modular action vehicle 500 based on one or more parameters or preferences. For example, the vehicle routing system 514 may determine a route based on fastest time, shortest distance, cost, road conditions (e.g., presence of potholes, loose rocks, and etc.), avoidance of toll roads, scheduled time for performing the work task request and the like. Further, the vehicle routing system 514 may determine a route based on traffic and/or weather information. The vehicle routing system 514 may also determine a route in consideration of locations of multiple work task requests or transportation requests received.

The vehicle user interface 515 may be an interface for an occupant or a user in the modular autonomous vehicle 500 to utilize. For example, the occupant may user the vehicle user interface 515 to input one or more inputs, such as modular autonomous vehicle attributes. The modular autonomous vehicle attributes may include, for example, location or route information about the modular autonomous vehicle 500's general availability to perform a work task in response to work task requests. Further, the vehicle user interface 515 may be used to input a response directly to a specific work task request. The vehicle user interface 515 may be a touch screen utilizing an underlying software. Further, the vehicle user interface 515 may be fixed to the modular autonomous vehicle 500, or may be portable device that connects to the modular autonomous vehicle 500. The portable device may be connected by a wire or via a direct wireless communication with the modular autonomous vehicle 500.

The external sensors 516 may include various sensors utilized by the modular autonomous vehicle 500 for detecting exterior surroundings, such as roads, buildings, various landmarks for determining a location of the modular autonomous vehicle 500. The external sensors 516 may include, without limitation, LIDAR sensors, RADAR sensors, image sensors (e.g., camera), ultrasonic sensor, millimeter-wave radar, accelerometer and the like. The external sensors 516 of varying types may be positioned at various parts of the modular autonomous vehicle 500. One or more of the external sensors 516 may acquire sensor information, which may include, without limitation, (i) image/video information acquired via a camera, (ii) point group data acquired via laser imaging detection and ranging (LIDAR), (iii) position information (e.g., longitude and latitude) acquired via a global navigation satellite system (GNSS), such as a global positioning system (GPS), (iv) information acquired from operation of the modular autonomous vehicle (e.g., tire rotation angle, travel speed, and etc.), (v) acceleration information acquired by an accelerometer, (vi) range image acquired by a millimeter-wave radar, and (vii) distance to an obstacle acquired by an ultrasonic sensor.

The power module 517 may include various car parts for moving the modular autonomous vehicle 500. The power module 517 may include wheels, engine, battery, drive train, power train, and other drive mechanisms for causing movement of the modular autonomous vehicle 500.

The modular part 520 may be interchangeable and may be attached to the driving part 510 of the modular autonomous vehicle 500. The modular part 520 includes internal sensors 521, internal fixture actuator(s) 522, detachable fixture(s) 523, a display 524 and a battery 525. The internal sensors 521 may include various sensors provided in a modular cabin of the modular autonomous vehicle 500. The internal sensors 521 may include cameras, microphones, motion sensors, infrared sensors, bio sensors and the like. The internal sensors 521 may be detachably installed in the modular cabin.

The internal fixture actuator 522 may be an actuator for moving a fixture provided in the modular part 520. For example, the internal fixture actuator 522 may be operated to move a fixture inside the modular part 520 to various locations via a rotating movement or translation movement. Further, the internal fixture actuator 522 may be used to hide a fixture within a compartment of the modular part 520. For example, a bed may be rotated vertically to be stored within a wall compartment of the modular part 520.

The detachable fixture(s) 523 may refer to one or more fixtures that may be detachably fixed or disposed in the modular part 520. In an example, the detachable fixture(s) 523 may include cooking equipment, coffee machines, alcoholic beverage dispensers, office furniture, office equipment, bedding and the like. One or more of the detachable fixture(s) 523 may be attached to the modular part 520 or detached from the modular part 520.

The display 524 may include one or more displays that are provided within the modular part 520, and may be configured to display an image. For example, the display 524 may be configured to display a particular company logo, an advertisement, name of the work task requester, details of the work task request or the like.

The battery 525 may be separate from battery provided in the driving part 510 of the modular autonomous vehicle 500. In an example, battery 525 may be a single battery or a system of batteries configured to power various equipment in the modular part 520. However, aspects of the present disclosure are not limited thereto, such that the battery 525 may supplement power of the driving part 510. Further, the battery 525 may be changed along with the modular part 520.

Figure 6A:
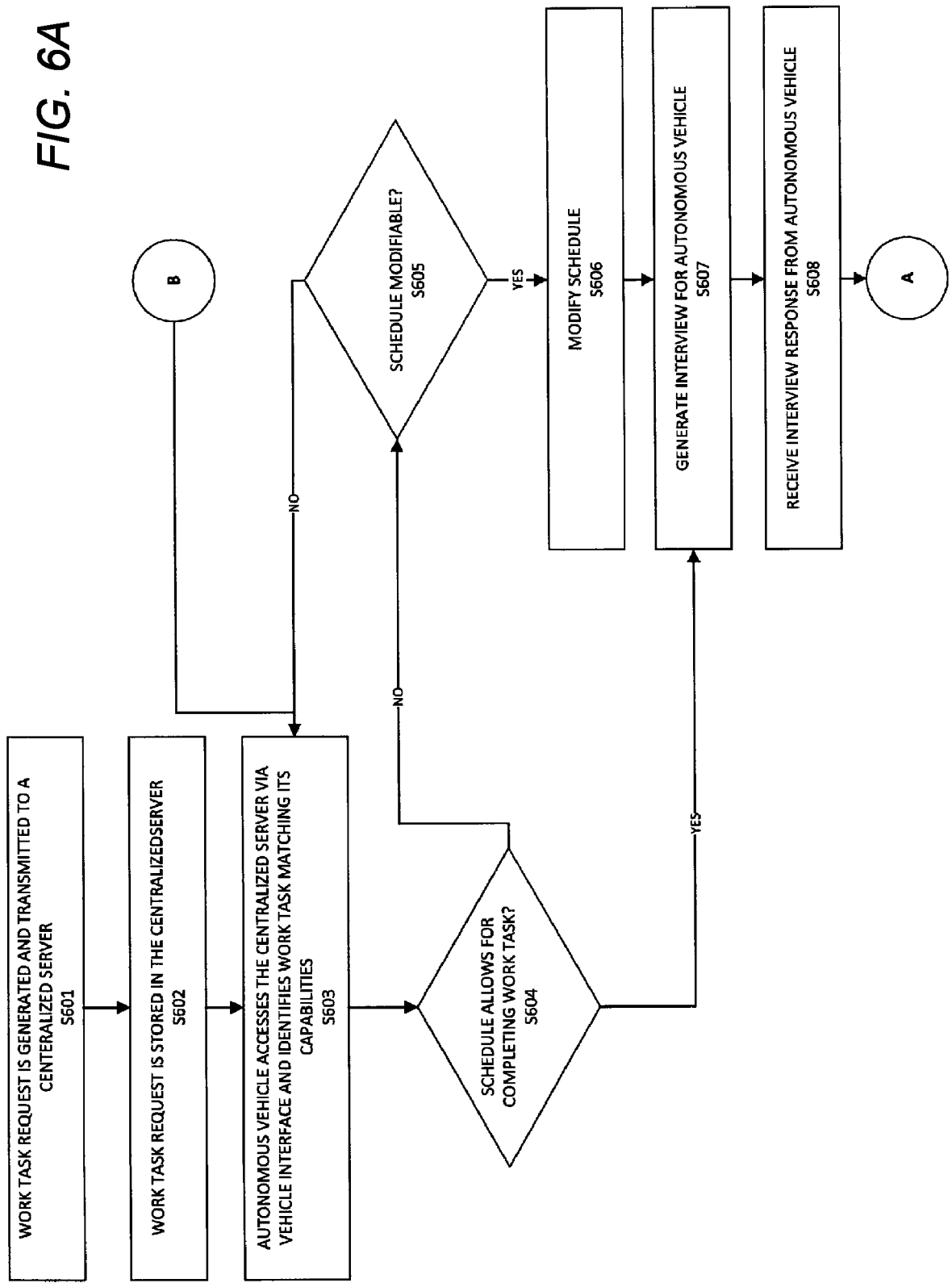
FIG. 6A shows a part of a method for generating and fulling a work request via a modular autonomous vehicle, according to an aspect of the present disclosure, according to aspects of the present disclosure.
Figure 6B:
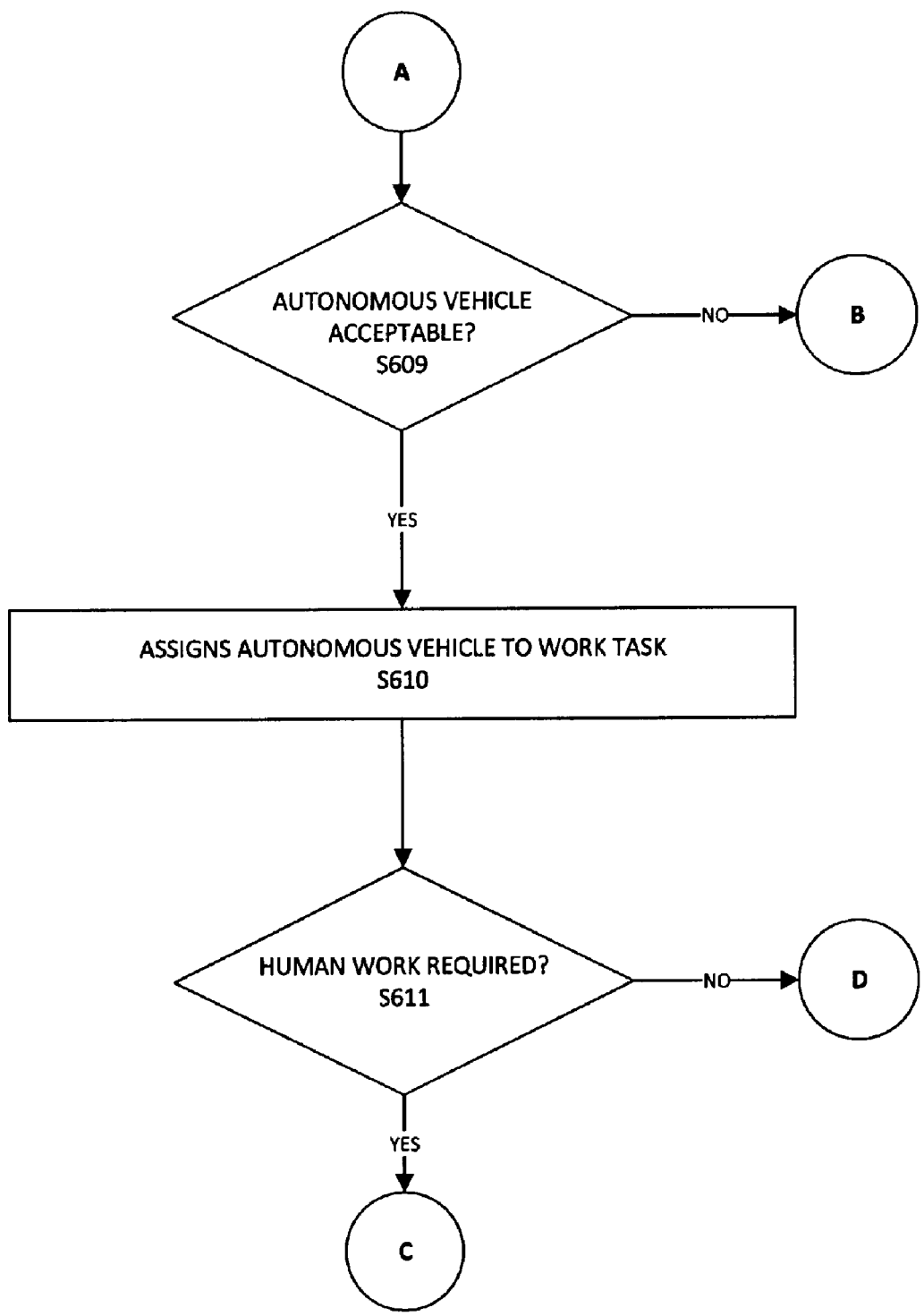
FIG. 6B shows another part of the method for generating and fulling a work request via a modular autonomous vehicle, according to an aspect of the present disclosure, according to aspects of the present disclosure.

FIGS. 6A-6C show a method for a method for generating and fulling a work request via a modular autonomous vehicle, according to an aspect of the present disclosure, according to aspects of the present disclosure.

In operation S601, a computing device (e.g., work task requesting device) generates a work task request for fulfillment by one or more modular autonomous vehicles and transmits the generated work task request to a centralized server (e.g., work task platform server). In an example, the computing device may include a mobile computing device (e.g., smart phone or tablet), a wearable computing device (e.g., smart watch), a personal computer, a kiosk or a computing device provided on a vehicle. In an example, the work task request may specify a work task to be performed, corresponding equipment necessary for carrying out the work task, a location at which the work task is to be performed, a time range for performing the work task, compensation information for performing the work task, requirement of human intervention, a number of modular autonomous vehicle required for performing the work task request and the like. Moreover, the work task request may additionally specify a preferred provider or provider type (e.g., independent provider, fleet provider, a specific named provider and the like). Further, the computing device may only specify the work task to be requested, and the computing device may auto generate the remaining specification based on a selection by the computing device. The work task to be requested may be listed for selection, or may be specified as a customized request. In addition, one or more of the specifications or requirements corresponding to the work task request may be negotiable, which may be modified based on availability, cost, or user selection. In an example, the compensation information may specify a flat rate amount or a variable rate amount based on one or more factors, such as time of fulfillment, quality of fulfillment, response time to the work task request (either response or performance) and the like.

In operation S602, the received work task request may be stored in the centralized server along with other work task requests that may have been requested. In an example, the received work task requests may be configured to be sorted based on one or more fields selected by a modular autonomous vehicle or an owner of a fleet. Further, the work task requests may be automatically sorted or filtered based on equipment information of the modular autonomous vehicle. The work task requests may have an expiration period, in which the work task requests may be purged from the centralized server. In addition, work task requests stored longer than a predetermined period of time (herein after referred to ask stale work task requests) may be returned to the work requesting device for adjustment to one or more specifications of the original work task request (e.g., equipment requirements, compensation information, and the like). Further, for the stale work task requests, such requests may be broadcasted actively by the centralized server to one or more modular autonomous vehicles meeting the requirements specified in the work task request.

In operation S603, a modular autonomous vehicle accesses the centralized server to identify one or more work task requests matching its capabilities. More specifically, the modular autonomous vehicle may determine its own properties and identify work tasks meeting the properties of the modular autonomous vehicle. According to aspects of the present disclosure, the modular autonomous vehicle may determine its own properties based on its current configuration or available configuration. For example, if the modular autonomous vehicle is capable of being equipped with a bed, even if it is not currently equipped with such, the modular autonomous vehicle may attempt to match its prospective properties with the work tasks.

In an example, the modular autonomous vehicle may sort or filter through work task requests based on a selection provided by the modular autonomous vehicle, which may be provided based on a current equipment configuration or available to the modular autonomous vehicle. Further, various modular autonomous vehicles may monitor work tasks stored in the centralized server via a vehicle interface. Individualized work tasks may be selected to view additional details associated with the work task.

Alternatively, the work task requests may be automatically sorted for the modular autonomous vehicle based on the current equipment information or available equipment information. For example, if the modular autonomous vehicle is currently equipped with coffee machines, but can be equipped with bedding at a later time, the modular autonomous vehicle may have access to both work tasks requesting coffee service as well as work tasks requesting hotel service.

Further, in an example, various modular autonomous vehicles operating within a particular range or radius of a location of the work task requesting device or a location at which the work task is to be performed may be notified when a new work task request is submitted.

In operation S604, the centralized server further checks whether the module autonomous vehicle applying for a work task has sufficient time available for completing the respective work task. More specifically, the centralized server may attempt to estimate amount of time required to complete a work task. The estimated amount of time may include travel time to the location at which the work task is to be performed, as well as traffic time. In addition, if human work is determined to be required, the estimated amount of time may additionally account for procuring human laborer for the work task.

Further, the centralized server may attempt to determine a timeframe within which the work task is to be carried out. The timeframe may be fixed or may have a range of times. In an example, the modular autonomous vehicle may be scheduled to perform various tasks, which may include transportation tasks, maintenance tasks (e.g., refueling, reconfiguration of the modular autonomous vehicle and the like), and other work tasks. Accordingly, when the modular autonomous vehicle applies to perform a work task, the centralized server may determine whether the modular autonomous vehicle will have sufficient time to perform the respective work task based on schedule information stored at the modular autonomous vehicle. In an example, the modular autonomous vehicle may transmit such schedule information when applying for a work task, or the centralized server may retrieve such schedule information from the modular autonomous vehicle when determining whether to assign the work task to the modular autonomous vehicle. The schedule information may additionally integrate or incorporate current or expected traffic condition information when determining whether the modular autonomous vehicle will have sufficient time to complete the work task being applied for.

If sufficient time is determined not to be available in operation S604, the method proceeds to operation S605. In operation S605, the centralized server determines whether or not the set schedule is modifiable. For example, certain passengers requesting transportation may be willing to work with more flexible travel schedule for lower fares. Further, certain maintenance schedules may be adjusted to accommodate for the work task. If the schedule of the modular autonomous vehicle is determined to be modifiable, then the schedule may be modified to accommodate for the work schedule in operation S606. On the other hand, if the schedule of the modular autonomous vehicle is unable to be modified, then application process for the respective work task terminates and the method proceeds back to operation S603, during which the modular autonomous vehicle may apply for another work task. In an example, when the modular autonomous vehicle applies for another work task, available work tasks available for selection may be filtered or sorted based on amount of time determined to be available during operation S604.

If sufficient time is determined to be available in operation S604, the method proceeds to operation S607 for continued application process for the work task. In operation S607, the centralized server generates interview questions for the modular autonomous vehicle. In an example, the interview questions may be generated by an interview generation algorithm, which may be stored in the work task assignment system 334 of FIG. 3. The centralized server may generate an interview inquiry to test the capabilities of the modular autonomous vehicle, and transmit such interview inquiry to a vehicle interface of the modular autonomous vehicle.

According to aspects of the present disclosure, the interview may be designed or generated based on information included in the work task request, which may include specific requirements on a cabin of the modular autonomous vehicle (e.g., size, features, technological capabilities and etc.). The interview is designed in such a way to allow the centralized server to verify that the modular autonomous vehicle applying for the work task possesses the required features to complete the work task. For example, the interview inquiry may request the modular autonomous vehicle to provide access to its in cabin cameras to verify interior features of the modular autonomous vehicle. If the modular autonomous vehicle is determined not to possess the required sensors or denies access to its sensors to respond to the interview inquiry, the module autonomous vehicle may be rejected from the application process for performing the work task.

In operation S608, the centralized server receives an interview response from the modular autonomous vehicle. More specifically, the modular autonomous vehicle may produce an interview response (e.g., image data of an interior of its cabin, access to its sensors, or etc.), and returns to the response to the centralized server via the vehicle interface. In an example, the interview response may be a simple transfer of information or may involve a use of the modular autonomous vehicle's sensors for verification of its capabilities.

In operation S609, a determination of whether the modular autonomous vehicle is acceptable to perform the work task is made. More specifically, the centralized server may compare evidence provided in the interview response with the requirements specified in the work task request to determine whether the modular autonomous vehicle would be acceptable. If the modular autonomous vehicle is determined to be acceptable, the method proceeds to operation S610 for assigning the work task to the modular autonomous vehicle. In an example, capability verification system included in the work task assignment system 334 of FIG. 3 may be utilized for making such determination.

Further, if more than one modular autonomous vehicle applies for the work task, the centralized server may compare the modular autonomous vehicles and select the more suitable modular autonomous vehicle. According to aspects of the present disclosure, the more suitable modular autonomous vehicle may be selected based on information provided in the work task request, at random, or whichever modular autonomous vehicle applies first. In an example, the comparison of the vehicles may be performed using an algorithm, such as the autonomous vehicle comparison algorithm.

If the modular autonomous vehicle is determined not to be acceptable, the modular autonomous vehicle is rejected from application of the work task and returns to operation S603 to search for another work task.

In operation S611, the centralized server determines whether human work is required for fulfilling the work task. According to aspects of the present disclosure, a work task request may be unable to be fully completed by the modular autonomous vehicle alone based on a manual component (e.g., cleaning of cabin or delivery of a package into hands of its recipient) explicitly or inherently specified in the work task request.

If the human work is determined to be required in operation S611, the method proceeds to operation S612. In operation S612, the centralized server transmits the work task request to another centralized server, such as the gig worker platform server 340 illustrated in FIG. 3. In an example, the work task request transmitted to the gig worker platform server may include a description of the human work task action or manual component required in the work task.

In operation S613, the gig worker platform server matches the human work task action with one or more gig workers registered in the gig worker platform server based on skills listed for the gig workers. In an example, the gig worker platform server may execute an algorithm, such as the gig matching algorithm 344A of FIG. 3, to identify one or more gig workers having appropriate or necessary skills to perform the human work task action specified in the work task. According to aspects of the present disclosure, skills of the gig workers may be determined based on a user profile of a corresponding gig worker. The user profile may include details of the corresponding gig worker and preferences of the gig worker. Further, the user profile may be created by the respective gig worker using a human interface of the gig worker platform server.

In operation S614, one of the identified gig worker accepts the human work task action. In an example, the identified gig workers may be notified of potential work via the human interface of the gig worker platform server, which the identified gig workers may accept or reject. The notification of potential work may additionally specify financial reward associated with completing the human work task action of the work task request. The financial reward may be specified by the work task request, and may be variable or fixed. In addition, the human work task action may further specify a particular route along which the assigned modular autonomous vehicle may take or is travelling. The notified gig worker may have an option to request transport by the assigned modular autonomous vehicle for additional efficiency. For example, if the human work task action is to perform cleaning service of a cabin of the assigned modular autonomous vehicle, the gig worker may perform the human work task while being transported to a requested destination. Alternatively, the notified gig worker may request transport from the assigned modular autonomous vehicle. In both scenarios, if transport is requested or selected by the gig worker, a meeting location, meeting time and/or cost of transport may be provided. Further, a traveling route of the assigned modular autonomous vehicle may be modified to coincide with the location of the gig worker.

In operation S615, the gig worker performs the human work task action. According to aspects of the present disclosure, contribution or performance of the gig worker may be assessed using in-cabin cameras or other sensors for determining completion of the human work task action. Further, quality of performance may additionally be determined based on data collected by the in-cabin cameras or sensors.

In operation S616, the gig worker receives compensation for the human work task action performed. In an example, the compensation may be calculated or adjusted based on the quality/standard and/or completeness of the work that was performed by the gig worker. In addition, the compensation paid to the gig worker may be further adjusted for transportation if such was requested or selected by the gig worker.

In operation S617, the assigned modular autonomous vehicle arrives at the location specified by the work task request and performs the work task. In an example, completion of the work task may be verified or confirmed by accessing the in-cabin cameras or sensors of the assigned modular autonomous vehicle.

Figure 7:
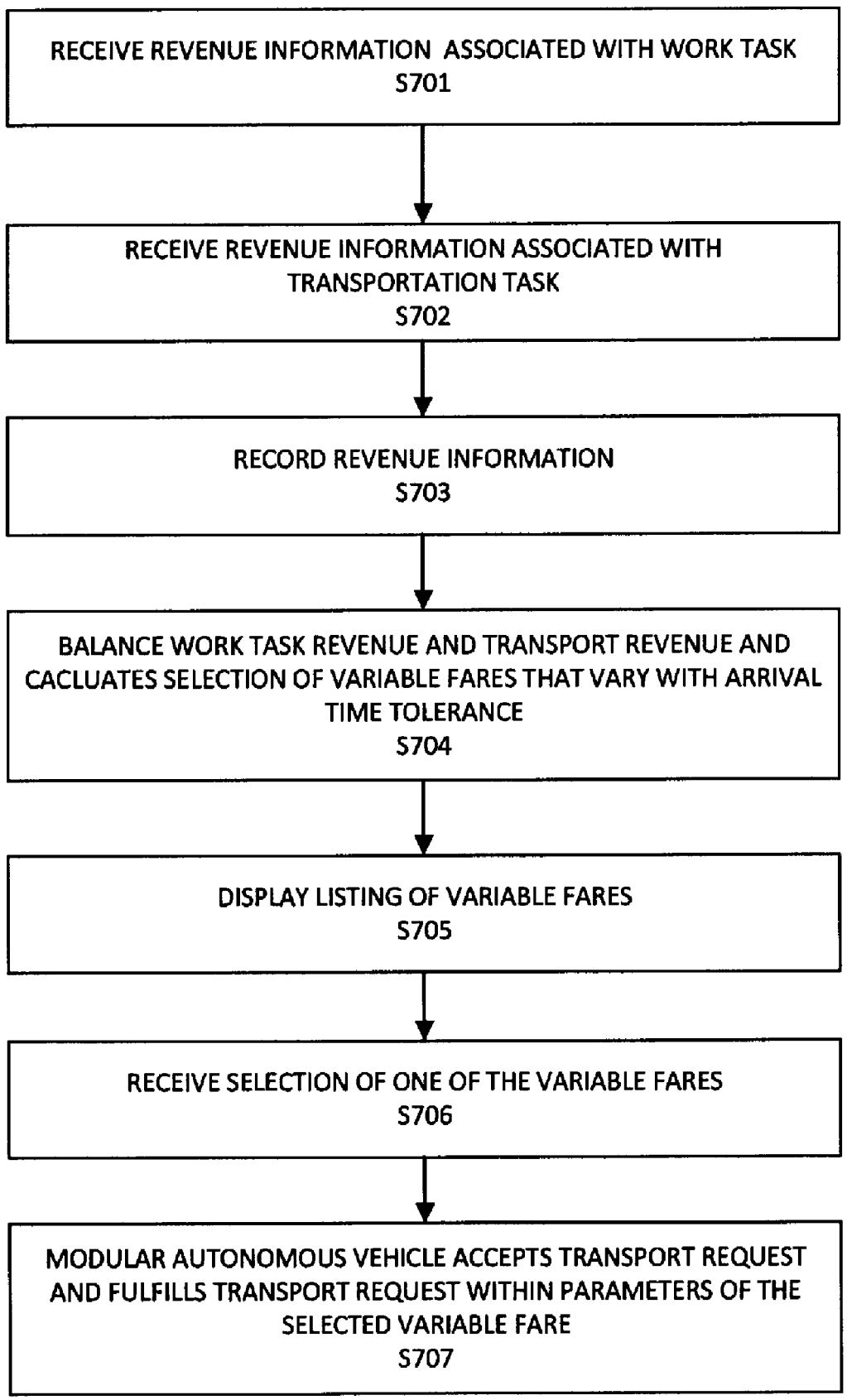
FIG. 7 shows a method for determining a variable fare by a modular autonomous vehicle assigned to a work task, according to aspects of the present disclosure.

FIG. 7 shows a method for determining a variable fare by a modular autonomous vehicle assigned to a work task, according to aspects of the present disclosure.

In operation S701, revenue information associated with a work task applied for by a modular autonomous vehicle is received by a centralized server, such as the revenue optimization system 350 of FIG. 3. According to aspects of the present disclosure, a work task revenue monitor extracts value of a work task revenue, which may be achieved by completing the work task specified in the work task request.

In an example, the revenue information associated with the work task may be received from the modular autonomous vehicle or from another centralized server.

In operation S702, revenue information associated with a transport request is also received at the centralized server. In an example, the modular autonomous vehicle may be scheduled to fulfill one or more transport requests and one or more work task requests. According to aspects of the present disclosure, a transport revenue monitor calculates transport revenue, which may be accrued from accepting a passenger's transport request.

In operation S703, the revenue information associated with the work task and the revenue information associated with the transport request are recorded at the centralized server.

In operation S704, the revenue optimization system balances or analyzes the work task revenue and the transport revenue, and calculates selection of variable fares that vary with arrival time tolerance based on the work task revenue and the transport revenue. In an example, the revenue optimization system may execute a fare optimization algorithm for calculating a range or selection of variable fares. The most expensive variable fare may not allow for any flexibility in the passenger's arrival time. Alternatively, the lower variable fares may offer the modular autonomous vehicle increased flexibility in time when the passenger wishes to arrive at his or her destination.

In operation S705, a list of variable fares calculated are displayed to the passenger for selection on a passenger interface.

In operation S706, the passenger selects one of the variable fares displayed to the passenger.

In operation S707, the modular autonomous vehicle accepts the transport request and meets the passenger at the specified location within the parameters specified by the selected variable fare.

Figure 8:
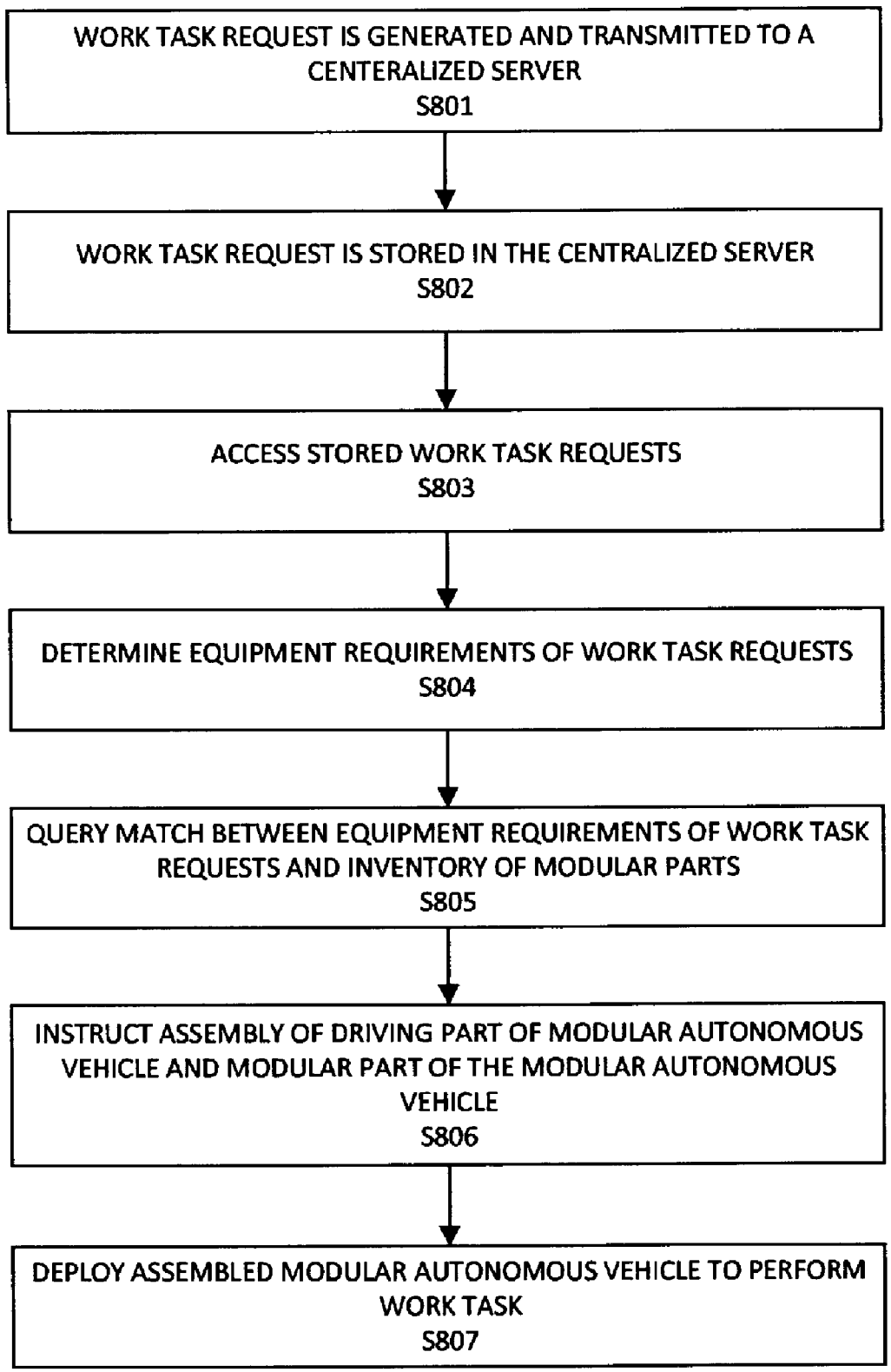
FIG. 8 shows a method for modifying a configuration of a modular autonomous vehicle based on a work task request, according to aspects of the present disclosure.

FIG. 8 shows a method for modifying a configuration of a modular autonomous vehicle based on a work task request, according to aspects of the present disclosure.

In operation S801, a computing device (e.g., work task requesting device) generates a work task request for fulfillment by one or more modular autonomous vehicles and transmits the generated work task request to a centralized server (e.g., work task platform server). In an example, the computing device may include a mobile computing device (e.g., smart phone or tablet), a wearable computing device (e.g., smart watch), a personal computer, a kiosk or a computing device provided on a vehicle. In an example, the work task request may specify a work task to be performed, corresponding equipment appropriate or necessary for carrying out the work task, a location at which the work task is to be performed, a time range for performing the work task, compensation information for performing the work task, requirement of human intervention, a number of modular autonomous vehicle required for performing the work task request and the like. Moreover, the work task request may additionally specify a preferred provider or provider type (e.g., independent provider, fleet provider, a specific named provider and the like). Further, the computing device may only specify the work task to be requested, and the computing device may auto generate the remaining specification based on a selection by the computing device. The work task to be requested may be listed for selection, or may be specified as a customized request. In addition, one or more of the specifications or requirements corresponding to the work task request may be negotiable, which may be modified based on availability, cost, or user selection. In an example, the compensation information may specify a flat rate amount or a variable rate amount based on one or more factors, such as time of fulfillment, quality of fulfillment, response time to the work task request (either response or performance) and the like.

In operation S802, the received work task request may be stored in the centralized server along with other work task requests that may have been requested. In an example, the received work task requests may be configured to be sorted based on one or more fields selected by a modular autonomous vehicle or an owner of a fleet. Further, the work task requests may be automatically sorted or filtered based on equipment information of the modular autonomous vehicle. The work task requests may have an expiration period, in which the work task requests may be purged from the centralized server. In addition, work task requests stored longer than a predetermined period of time (herein after referred to ask stale work task requests) may be returned to the work requesting device for adjustment to one or more specifications of the original work task request (e.g., equipment requirements, compensation information, and the like). Further, for the stale work task requests, such requests may be broadcasted actively by the centralized server to one or more modular autonomous vehicles meeting the requirements specified in the work task request.

In operation S803, the work task requests stored in the centralized server are accessed by a modular autonomous vehicle or a computer (e.g., a computing device from a management office of a fleet operator). In operation S804, equipment requirements of the work task requests are determined. In an example, certain equipment requirements may be deemed mandatory whereas other equipment requirements may be a negotiable, preferred or optional requirement. Further, for certain equipment requirements, a particular level may be specified. For example, if a bed is indicated as a required equipment, basic or luxury bed may be specified. In this example, the level of the bed may be specified as negotiable, preferred or optional in the work task request.

In operation S805, a query is executed to identify a match between the equipment requirements specified in the work request and inventory of modular parts that are available to be equipped on the modular autonomous vehicle. For example, if the modular autonomous vehicle is at (or is planned to be at) a fleet lot and has access to inventory of modular parts, a match may be performed based on the inventory of parts and not necessarily based on the current equipment. More specifically, the modular vehicle may be configured with a separate driving part and a modular part, which may be differently combined.

Alternatively, if the inventory of modular parts is not accessible, the match may be performed based on equipment currently present on the modular autonomous vehicle.

In operation S806, once the required equipment is identified within the inventory of modular parts, the modular part including the required equipment may be combined with the driving part to assemble a modular autonomous vehicle for fulfilling the work task. Alternatively, the required equipment may be installed within a currently attached modular part of the modular autonomous vehicle.

In operation S807, the assembled modular autonomous vehicle is deployed to perform the work task.

Aspects of the present disclosure provide an opportunity for modular autonomous vehicles to take part in a gig economy, whereby businesses and organizations can expand both their service provision and customer base by hiring a modular autonomous vehicle on a short-term basis for a particular function. Quality and suitability of a modular autonomous vehicle may be automatically assessed through an interview process performed by machines, ensuring that the modular autonomous vehicle may fulfill the requested work task. According to aspects of the present disclosure, an ability ability for a business/organisation to algorithmically verify that a modular autonomous vehicle they intend to hire for a particular task is capable of completing it, avoiding the risk of loss of business resulting from unsatisfied customers. Further, aspects of the present disclosure provide more flexible business opportunities for both work task requestors and operators/owners of autonomous vehicles, enabled by a sharing economy-style gig framework. According to further aspects of the present disclosure, increased affordability of transportation by enabling passengers to directly trade manual work for transportation to a desired location via an autonomous vehicle may be provided. Also, increased productivity of the modular autonomous vehicles may be provided by enabling a vehicle to carry out a work task and transport a passenger simultaneously, enabled by a system of flexible fares. Moreover, reduced environmental impact of vehicular activities may be provided by combining passenger transportation with other activities, such as deliveries.

Issues being resolved by aspects of the present disclosure include, without limitation, (i) how to allow an entity (e.g., restaurant or business) to schedule autonomous vehicles, which they do not own to act as temporary assets that can be used as part of their service offering, (ii) how to enable an entity that has advertised a work task to assess an autonomous vehicle prior to awarding the respective autonomous vehicle a temporary contract, (iii) how to allow work task-advertising entities to use gig economy contributors in scenarios where the requested work cannot be fully automated (e.g., requiring human participation), and (iv) how to enable a participating autonomous vehicle to combine various work tasks, in such a way that human contribution is enabled where: (a) a work task that requires human participation can be completed using qualified labour, and (b) the autonomous vehicle can perform the work task whilst also performing a secondary human transportation task.

Hereinafter, an example of a work task completion support system for providing implementation of work task in the embodiment illustrated in FIGS. 1 to 8 will be described.

In the present embodiment, an event that provides an outdoor eating and drinking service (for example, an outdoor restaurant) is exemplified as a work task, an event organizer who holds this event is illustrated as a work task requester, and an event holding support system for supporting the holding of this event will be described.

<Overview and Overall Configuration of Event Holding Support System>

Figure 9:
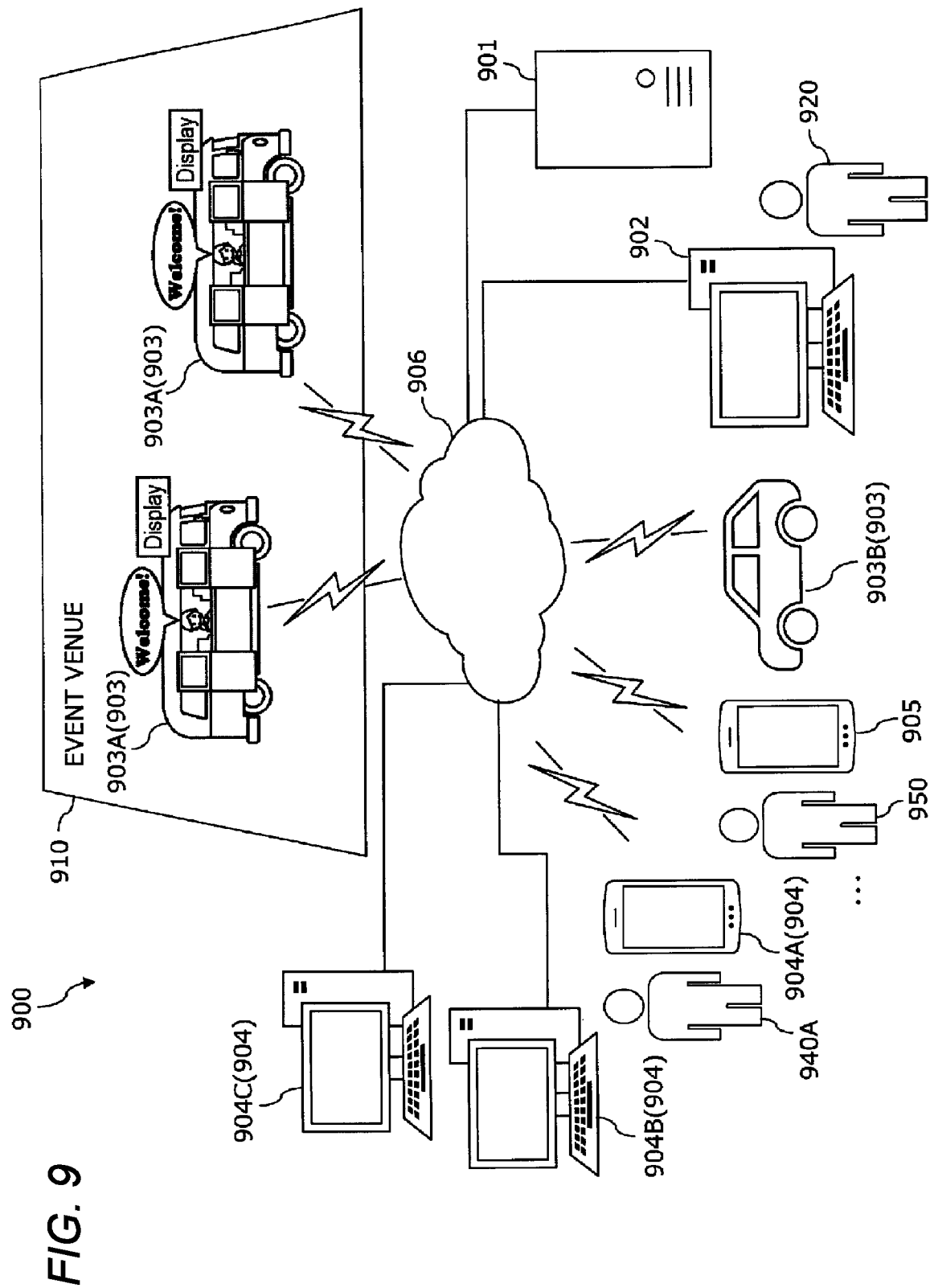
FIG. 9 shows a diagram illustrating an overview of an event holding support system according to an additional embodiment.

FIG. 9 is a diagram illustrating an overview of an event holding support system 900 according to an additional embodiment.

The overview of the event holding support system 900 according to this embodiment is that when an event organizer 920 sends a proposal of an event to the event holding support system 900, a server 901 arranges service elements (autonomous vehicle 903, cook 940A, food, and event venue 910) required for the event and attracts customers 950 who participate in the event to support holding of the event.

Individuals or small-scale entrepreneurs, such as individual business owners, often do not have assets for holding an event that requires various service elements, even when they think of an event plan. In addition, individuals or small-scale entrepreneurs may not have means for selecting a service provider required for the event or means for attracting customers of the event. Accordingly, even if individuals or small-scale entrepreneurs think of an event, there is a circumstance that the event itself cannot be held, it takes time to arrange various service elements, and even if the event is held, the event cannot attract enough customers or the event cannot be profitable. Also, service providers such as gig workers who have assets for providing services may experience lost opportunities due to free time between jobs within a day. There is also a circumstance that it is difficult to plan an event that attracts customers and is profitable because there is no means for matching an event organizer and a customer's request.

Examples of the event organizer 920 include an event planner who plans an event as a business, a service provider who has an asset, and a customer who participates in the event. As described above, an event planner does not have assets, and it is difficult for the event planner to hold an event that can attract customers and make a profit. Even if the service provider holds an event, it may be difficult for the service provider to provide a targeted customer with timely service. Even if a customer who does not have the assets for holding the event tries to hold the event on his/her own, it may be difficult for the customer to arrange a desired shop or personnel.

The event holding support system 900 according to this embodiment has an object to support holding an event quickly even by an individual or a small-scale entrepreneur and satisfy the requests of the event organizer 920, the service provider, and the customer 950.

As illustrated in FIG. 9, the event holding support system 900 is configured to include at least a server 901, an event organizer's terminal 902, an autonomous vehicle 903, a service provider's terminal 904, and a customer's terminal 905. Here, as the autonomous vehicle 903 providing service at an event, a shop vehicle 903A equipped with equipment of an outdoor restaurant, and a transportation vehicle 903B transporting the service provider and the customer 950 to the event venue 910 are exemplified. An example in which, as a service provider's terminal 904 owned by a service provider who provides a service at an event, a cook's terminal 904A owned by a cook 940A, a food provider's terminal 904B owned by a food provider, and a place provider's terminal 904C owned by a place provider who manages the event venue 910 provide service at an event, is indicated. In this embodiment, the shop vehicle 903A or the transportation vehicle 903B may be referred to as the autonomous vehicle 903, and the cook's terminal 904, the food provider's terminal 904B or the place provider's terminal 904C may be referred to as the service provider's terminal 904.

The server 901, the event organizer's terminal 902, the autonomous vehicle 903, the service provider's terminal 904, and the customer's terminal 905 are respectively connected through the network 906. The network 906 includes at least a wired or wireless line and is configured to include a part or all of an Internet line, and, may optionally include, for example, a local area network (LAN), a wide area network (WAN), a portable telephone network, and other types of networks.

The autonomous vehicle, the service provider, and the customer are registered as members in advance in the server 901 of the event holding support system 900. For example, in the case of the autonomous vehicle, identification information of the autonomous vehicle (owner and manager information, contact information, and the like), vehicle information (vehicle type, capacity, and the like), equipment of the vehicle (cooking appliances and the like), providable services, and the like are registered. In the case of the service provider, identification information of the service provider (business owner or company information, contact information, and the like) and information of the service provision contents (in the case of the cook, a cook, a career, a culinary genre or a menu that the cook is good at, and the like, in the case of the food provider, available food, time, quantity, and the like, in the case of a place provider, location of available places, site area, and the like) are registered in the server 901 through the service provider's terminal 904. Also, in the case of the customer, customer information such as personal information (name, age, gender, contact information, and the like), identification information of the customer terminal 905 possessed by the customer, a service set identifier (SSID) used in wireless communication are registered in the server 901 through the customer's terminal 905.

In order to support holding of the event that the event organizer 920 wants to hold, in the event holding support system 900, the server 901 comprehensively manages and controls transmission and reception of data or information with each terminal or the autonomous vehicle constituting the event holding support system 900. When the server 901 receives event information including at least contents and date and time of the event from the event organizer's terminal 902 by an operation of the event organizer 920, the server 901 sends event advertisement information including the place of the event venue that matches the date and time and contents of the event to the respective customer's terminals 905 of the customers 950 registered as members. The server 901 determines whether or not to hold an event based on the presence or absence of participation intention display of the event generated based on the operation of each customer 950. A specific internal configuration of the server 901 will be described later with reference to FIG. 10.

The event organizer's terminal 902 is configured by a computer such as a personal computer (PC), for example. The event organizer's terminal 902 is a terminal used by the event organizer 920. The event organizer's terminal 902 generates event information including at least the contents and the date and time of the event by the operation of the event organizer 920 and sends the event information to the server 901. A specific internal configuration of the event organizer's terminal 902 will be described later with reference to FIG. 11.

The autonomous vehicle 903 is an autonomous vehicle arranged by the server 901 so that the event organizer 920 can hold an event. When the autonomous vehicle 903 receives a service provision request including the event information from the server 901, the autonomous vehicle 903 generates service provision content information during event holding by an operation of a manager (not illustrated) of the autonomous vehicle 903 and sends the service provision content information to the server 901. For example, the shop vehicle 903A arrives at the event venue 910 before the event is held, and stops as it is to provide a food service while the event is held. The shop vehicle 903 is used by at least one culinary staff who cooks and prepares food and beverages to be provided to event participant customers. The transportation vehicle 903B is an autonomous vehicle arranged by the server 901 so that the event organizer 920 can hold the event. When the service provision request including the event information from the server 901 is received, the transportation vehicle 903B generates service provision content information during event holding and sends the service provision content information to the server 901 by the operation of a manager (not illustrated) of the transportation vehicle 903B. When a reservation is received from some event participant customers or service providers, the transportation vehicle 903A moves to the place of the event participant customer or service provider who made the reservation before the event is held, picks up the event participant customer or service provider, and transports the event participant customer or service provider to the event venue 910. A specific internal configuration of the autonomous vehicle 903 will be described later with reference to FIG. 12.

The service provider's terminal 904 is configured by, for example, a computer such as a PC, a smartphone, or a tablet terminal. The service provider's terminal 904 is a terminal used by the service provider that provides service arranged by the server 901 so that the event organizer 920 can hold an event. When a service provision request including event information is received from the server 901, the service provider's terminal 904 generates service provision content information during event holding and sends the service provision content information to the server 901 by the operation of the service provider. A specific internal configuration of the service provider's terminal 904 will be described later with reference to FIG. 13.

The customer's terminal 905 is a terminal possessed by the customer 950 who applies for participation in the event, and is, for example, a portable terminal such as a smartphone or a tablet terminal capable of wireless communication. When event advertisement information transmitted from the server 901 is received, the customer's terminal 905 generates an event participation application indicating the intention to participate in the event and sends the event participation application to the server 901 by the operation of the customer 950 who has viewed the contents of the event information. A specific internal configuration of the customer's terminal 905 will be described later with reference to FIG. 14.

<Server Configuration>

Figure 10:
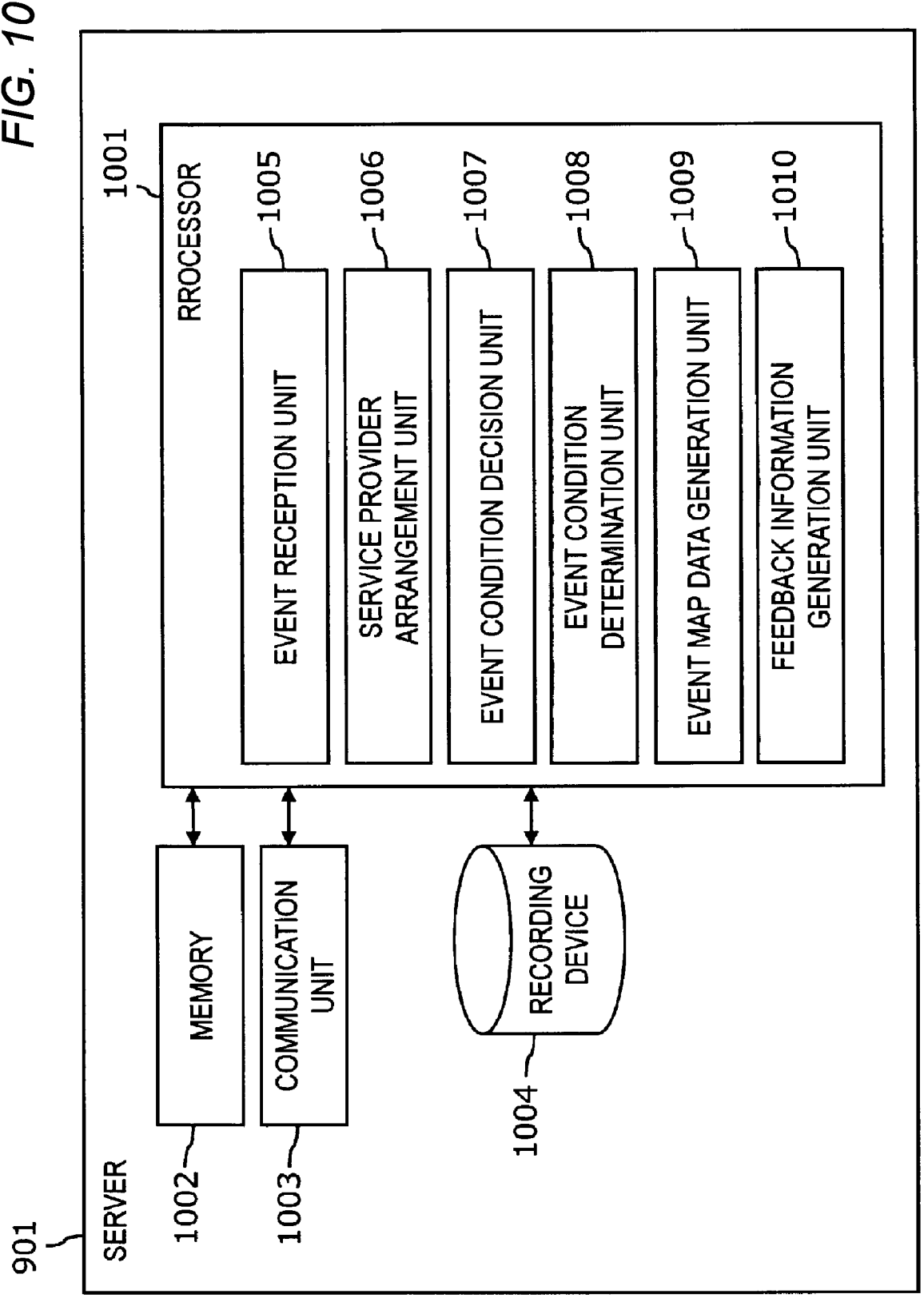
FIG. 10 shows a block diagram illustrating a configuration of a server illustrated in FIG. 9.

FIG. 10 is a block diagram illustrating a configuration of server 901 illustrated in FIG. 9. The server 901 is configured to include a processor 1001, a memory 1002, a communication unit 1003, and a recording device 1004. The server 901 may be built on-premises, or may be built using a cloud service.

The memory 1002 is configured by using a primary storage device (for example, a random access memory (RAM), a read only memory (ROM)), and temporarily stores programs required for execution of the operation of the server 901, and further, data or information generated during the operation. The RAM is, for example, a work memory used when the processor 1001 operates. In the ROM, for example, a program for controlling the processor 1001 is stored in advance.

The communication unit 1003 is configured by a communication circuit that communicates with each of the event organizer's terminal 902, the autonomous vehicle 903, the service provider's terminal 904, and the customer's terminal 905 through the network 906. As a communication method by the communication unit 1003, for example, a wired communication method such as the WAN, the LAN, and the power line communication corresponding to the network 906, a wireless communication method such as WiFi (registered trademark), mobile communication for mobile phone, and the like are exemplified. For example, the communication unit 1003 receives event information sent from the event organizer's terminal 902. The communication unit 1003 distributes (for example, push notification) the event advertisement information to each of the customer's terminals 905 of the plurality of customers 950 who are registered as members. With this configuration, the server 901 can advertise the presence and contents of the event organizer 920 to each of the members (customers 950) of the event holding support system 900.

The recording device 1004 is configured by using a secondary storage device (for example, a hard disk drive (HDD) or a solid state drive (SSD)) or a tertiary storage device (for example, an optical disk or an SD card). The recording device 1004 stores the member information (autonomous vehicle, service provider, customer) described above, event information sent from the event organizer's terminal 902, and event feedback information (including event information, event conditions, information of autonomous vehicles that are arranged and service providers who are arranged, customer information applied for event participation, holding or non-holding of event, external factors (weather condition, traffic condition around the event venue, and the like), customer feedback information, and the like).

The processor 1001 is configured by using, for example, a central processing unit (CPU), a digital signal processor (DSP), or a field programmable gate array (FPGA). The processor 1001 functions as a control unit of the server 901, and performs control processing to comprehensively control the overall operation of each unit of the server 901, input and output processing of data with each unit of the server 901, arithmetic processing of data, and storing processing of data. The processor 1001 operates according to a program stored in the memory 1002.

The processor 1001 includes at least an event reception unit 1005, a service provider arrangement unit 1006, an event condition decision unit 1007, an event condition determination unit 1008, and an event map data generation unit 1009, and a feedback information generation unit 1010 as functional (software) configurations that can be realized by execution of a program. The processor 1001 may have at least a part of the functions of work task platform server, gig worker platform server, and revenue optimization system server illustrated in FIGS. 2 and 3 may be included.

The event reception unit 1005 acquires event information sent from the event organizer's terminal 902 according to an operation of the event organizer 920 on the event organizer's terminal 902. The event information includes the contents of the event (for example, an outdoor restaurant), the date and time (for example, start and end dates and times), the expected number of customers (for example, the minimum and maximum number of people performing business considering feasibility), and the desired budget and balance. The event information may further include information indicating the place of the event venue that matches the contents of the event. That is, the event reception unit 1005 acquires information on an event planned by the event organizer 920 who does not have sufficient assets required for holding the event.

Based on the event information sent from the event organizer's terminal 902, the service provider arrangement unit 1006 selects (in other words, of service providers who can support the holding of events matching the event information) an asset (for example, an autonomous vehicle and a service provider capable of providing various services) required for holding the event. The service provider arrangement unit 1006 sends a service provision request including event information sent from the event organizer's terminal 902 to each of the selected one or more autonomous vehicles or the service provider's terminal used by the service provider.

Based on the event information acquired by the event reception unit 1005, the event condition decision unit 1007 determines the minimum value and the maximum value (that is, the minimum number of people performing business and the maximum number of people performing business) of the number of customers required to hold the event and the reception deadline of the event participation application. The condition for holding an event is that the number of reception of an event participation application from customers is to be at least the minimum value or more and the maximum value or less. That is, the event organizer 920 sets the lower limit and the upper limit of the number of event participant customers in order to satisfy the initially assumed balance, and sets the reception deadline of the event participation application in consideration of the scheduled event date and time. The upper limit is preferably determined in consideration of the feasibility of holding the event. The event condition decision unit 1007 may set an event participation privilege to be given to an event participant customer who satisfies a predetermined condition. For example, a privilege limited to the first N arrival people (N is the minimum number of people performing business, for example) may be set or a privilege to a customer who has invited a companion may be set. In this way, the feasibility of holding of the event can be improved by providing an incentive for customers to participate in the event. The event condition decision unit 1007 may adjust the number of people performing business, a reception deadline of the event participation application, and the contents and conditions of an event participation privilege after arrangement of the service provider is actually completed.

The event condition determination unit 1008 determines whether or not to hold an event based on the number of receptions of the event participation application sent from the customer terminal 905 by the operation based on reaction of each of the customers 950 who has viewed the event advertisement information sent to the customer's terminals 905 of the customers registered as members.

The feedback information generation unit 1010 acquires customer feedback information sent from the customer's terminal 905 during event holding or after event holding, links the customer feedback information to event holding result information recorded in the recording device 1004, and generates event feedback information. The event feedback information is provided to the event organizer's terminal 902, for example.

<Configuration of Event Organizer's Terminal>

Figure 11:
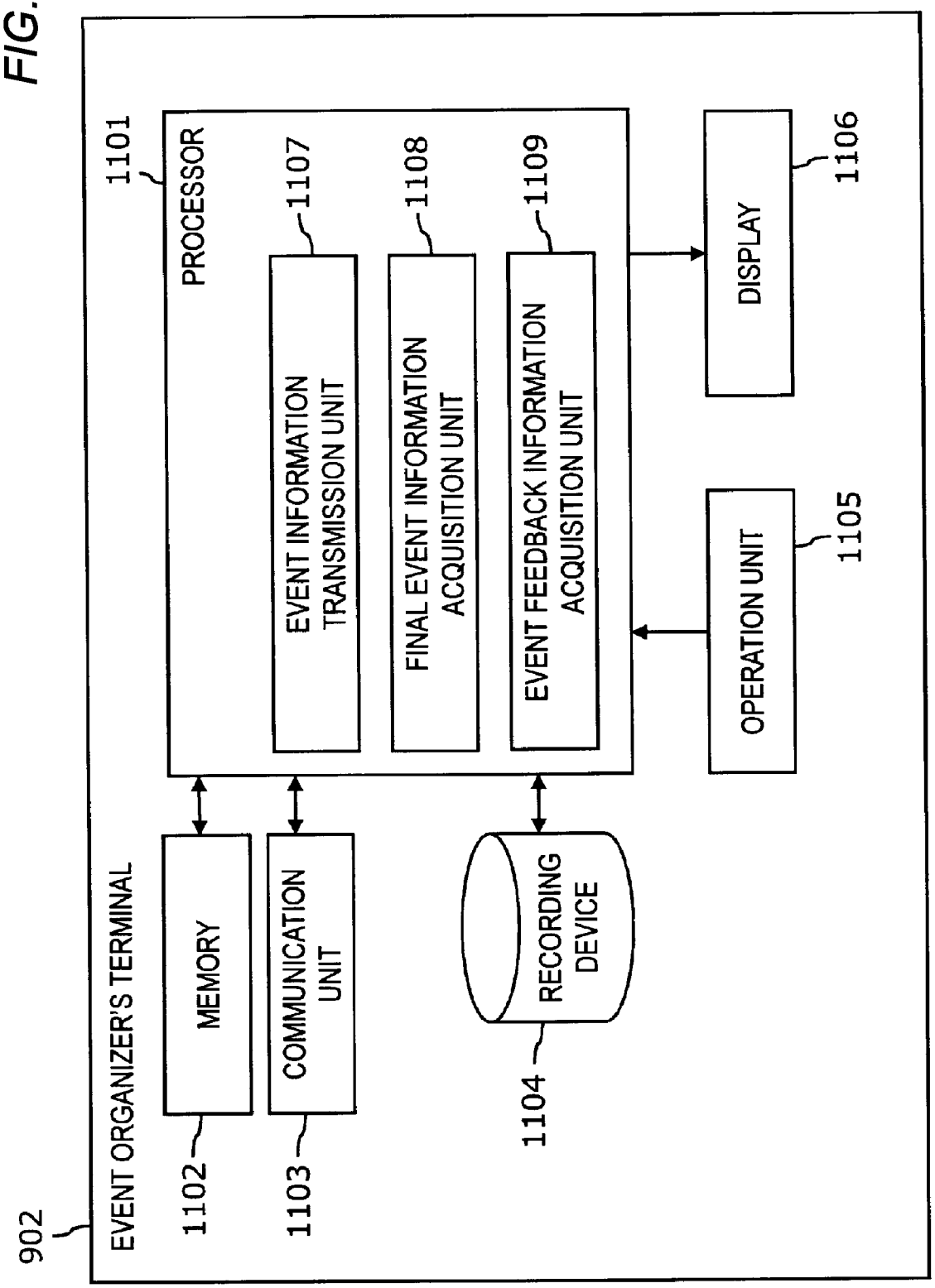
FIG. 11 shows a block diagram illustrating a configuration of an event organizer's terminal illustrated in FIG. 9.

FIG. 11 is a block diagram illustrating the configuration of the event organizer's terminal 902 illustrated in FIG. 9. The event organizer's terminal 902 includes a processor 1101, a memory 1102, a communication unit 1103, a recording device 1104, an operation unit 1105, and a display 1106. The event organizer's terminal 902 is a terminal used by the event organizer 920, and receives an input of the event information composed of various types of information such as the contents of the event that the event organizer 920 wants to hold by the operation of the event organizer 920.

The memory 1102 is configured by using a primary storage device (for example, a RAM, a ROM), and temporarily stores a program required for execution of an operation of the event organizer's terminal 902, and further, temporarily stores data or information generated during the operation. The RAM is, for example, a work memory used when the processor 1101 operates. In the ROM, for example, a program for controlling the processor 1101 is stored in advance.

The communication unit 1103 is configured by a communication circuit that communicates with the server 901 through the network 906. As a communication method by the communication unit 1103, for example, a wireless communication method such as WAN, LAN, WiFi (registered trademark), mobile communication for mobile phone, and the like corresponding to the network 906 is exemplified. For example, the communication unit 1103 sends the event information delivered from the processor 1101 to the server 901.

The recording device 1104 is configured by using a secondary storage device (for example, an HDD or an SSD) or a tertiary storage device (for example, an optical disk or an SD card). The recording device 1104 stores event map data (see FIG. 17) of the day of the event sent from the server 901. Here, the event map data is a layout diagram illustrating a placement location of the shop vehicle 903A of the event venue 910 on the day of the event.

The operation unit 1105 receives an operation of the event organizer 920, and delivers data or information input by the operation to the processor 1101.

The display 1106 is configured as, for example, an organic EL display or a liquid crystal display, and displays data or information delivered from the processor 1101. For example, the display 1106 displays event map data (see FIG. 17) delivered from the processor 1101.

The processor 1101 is configured by using, for example, a CPU, a DSP or an FPGA. The processor 1101 functions as a control unit of the event organizer's terminal 902, and performs control processing to comprehensively control the overall operation of each unit of the event organizer's terminal 902, input and output processing of data with each unit of the event organizer's terminal 902, arithmetic processing of data, and storing processing of data. The processor 1101 operates according to a program stored in the memory 1102.

The processor 1101 includes at least an event information transmission unit 1107, a final event information acquisition unit 1108, and an event feedback information acquisition unit 1109 as functional (software) configurations that can be realized by execution of a program.

The event information transmission unit 1107 acquires event information input by the operation of the event organizer 920, and transmits (sends) the event information to the server 901 through the communication unit 1103.

The final event information acquisition unit 1108 acquires event determination notification (in particular, final event information included in event holding determination notification) sent from the server 901. This final event information includes, in addition to the event information sent from the event information transmission unit 1107 to the server 901, information (list) on each of the event participant customers received in the server 901 and information (list) on an autonomous vehicle and a service provider who supporting event holding. The final event information acquisition unit 1108 stores the final event information in the recording device 1104.

The event feedback information acquisition unit 1109 acquires event feedback information sent from the server 901, and stores the event feedback information in the recording device 1104.

<Configuration of Autonomous Vehicle>

Figure 12:
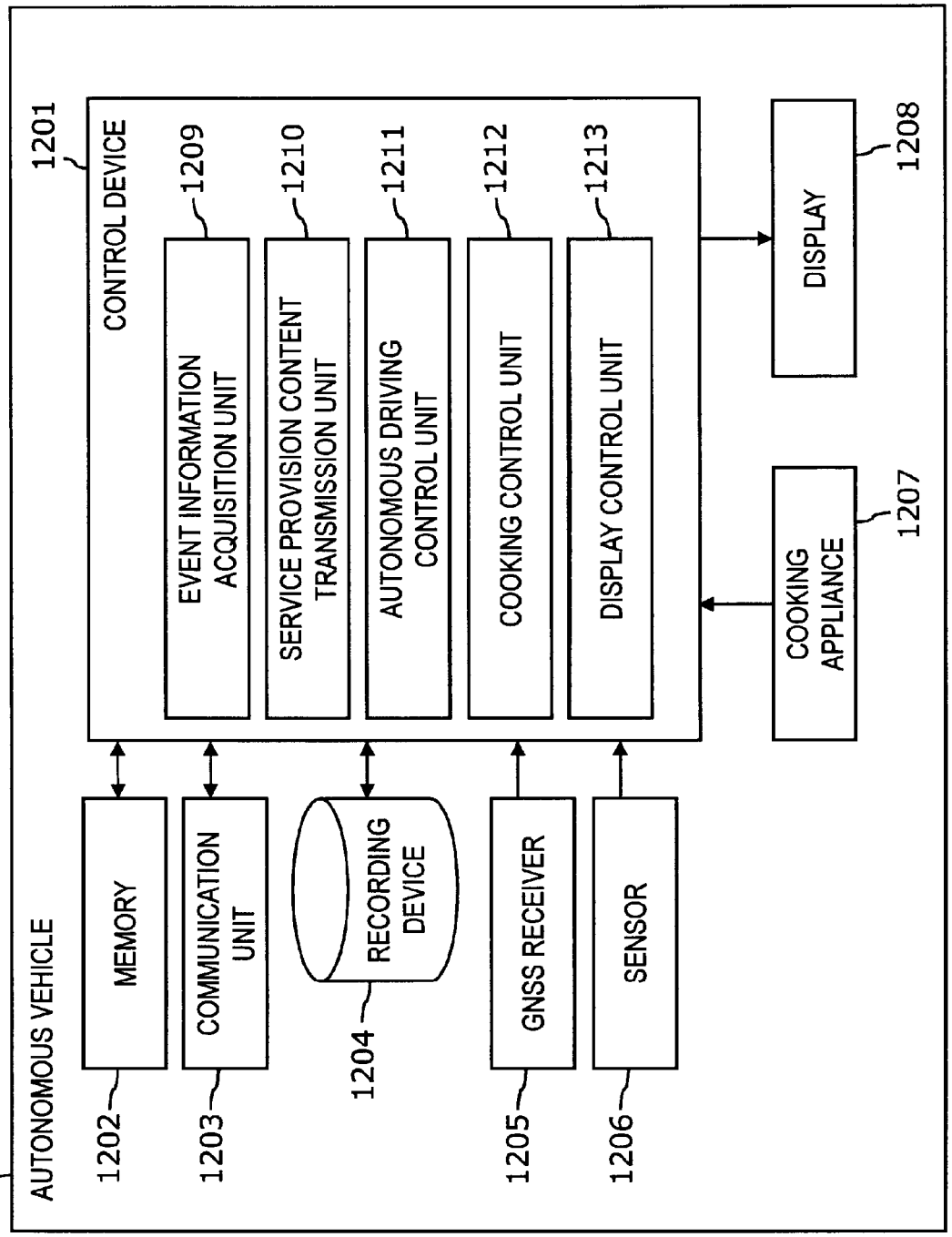
FIG. 12 shows a block diagram illustrating a configuration of an autonomous vehicle illustrated in FIG. 9.

FIG. 12 is a block diagram illustrating the configuration of the autonomous vehicle 903 illustrated in FIG. 9. The autonomous vehicle 903 is configured to include at least a control device 1201, a memory 1202, a communication unit 1203, a recording device 1204, a global navigation satellite system (GNSS) receiver 1205, and a plurality of sensors 1206. The autonomous vehicle 903 may be equipped with additional equipment depending on the service to be provided. For example, in the case of the shop vehicle 903A, the cook appliances 1207 and the display 1208 are further included, and based on the service provision request from the server 901, a service for providing food and drink is provided to each customer 950 as a shop (outdoor restaurant) at the event venue 910 during an event holding.

The GNSS receiver 1205 detects position information of the autonomous vehicle 903. Specifically, the GNSS receiver 1205 receives satellite positioning signals indicating the transmission time and the position (coordinates) of each GNSS satellite from each of a plurality of GNSS satellites (not illustrated), calculates the latitude and longitude of the reception point (that is, the position of the autonomous vehicle 903) based on the reception of each satellite positioning signal, and outputs this calculation result to the control device 1201 as position information of the autonomous vehicle 903.

The plurality of sensors 1206 are configured to include a plurality of sensors, detect obstacles in the external environment or surroundings of the autonomous vehicle 903, and output detection results to the control device 1201. As the sensor 1206, for example, a camera, a millimeter wave radar, a sonar radar, a light detection and ranging, a laser imaging detection and ranging (LiDAR), and the like are exemplified. The camera includes an imaging element such as, for example, a charge coupled device (CCD) or a complementary metal oxide semiconductor (CMOS). The camera is installed on a part (for example, a loading platform) of the autonomous vehicle 903, captures a predetermined range outside the vehicle as a detection range, and outputs data of a captured image to the control device 1201.

The memory 1202 is configured by using a primary storage device (for example, a RAM, a ROM), and temporarily stores a program required for execution of an operation of the autonomous vehicle 903, and further, temporarily stores data or information generated during the operation. The RAM is, for example, a work memory used when the control device 1201 operates. In the ROM, for example, a program for controlling the control device 1201 is stored in advance. The memory 1202 may be built in the control device 1201. The memory 1202 stores information of service provision contents that the autonomous vehicle 903 can realize for the event holding.

The communication unit 1203 is configured by a communication circuit that communicates with the server 901 through the network 906. As a communication method by the communication unit 1203, for example, a wireless communication method such as WAN, LAN, WiFi (registered trademark), mobile communication for mobile phone, and the like corresponding to the network 906 is exemplified. For example, the communication unit 1203 receives event information transmitted from the server 901. The communication unit 1203 sends the information on the service provision contents of the autonomous vehicle 903 delivered from the control device 1201 to the server 901.

The recording device 1204 is configured by using a secondary storage device (for example, an HDD or an SSD) or a tertiary storage device (for example, an optical disk or an SD card). The recording device 1204 stores information on service provision contents that the autonomous vehicle 903 described above can realize for the event holding. The recording device 1204 stores menu information of the service provision contents (for example, an outdoor restaurant) and image data such as an icon corresponding to the menu information. The recording device 1204 stores schedule data indicating a daily use reservation status (for example, availability information of the autonomous vehicle 903 for each month, day, and time zone) of the autonomous vehicle 903.

The cooking appliances 1207 is configured by cookware or a cooking system used for cooking or preparation of food provided during an event holding, and operates based on an instruction from the control device 1201. When the autonomous vehicle 903 (for example, in the case of the transportation vehicle 903B) does not require cooking, the cooking appliances 1207 may be omitted.

The display 1208 is, for example, an organic electroluminescence (EL) display, and displays menu information of food and drink that can be provided by the autonomous vehicle 903 (shop vehicle 903A) during the event holding and image data corresponding to the menu information, based on an instruction from the control device 1201. When foreign visitors are expected to visit the event, information corresponding to multiple languages may be displayed on the display 1208. In addition, when the autonomous vehicle 903 does not require display toward the outside, the display 1208 may be omitted.

The control device 1201 is configured by using, for example, a single or a plurality of electronic control units (ECUs). The control device 1201 functions as a control unit of the autonomous vehicle 903, and performs control processing to comprehensively control the overall operation of each unit of the autonomous vehicle 903, and input and output processing of data with each unit of the autonomous vehicle 903, arithmetic processing of data, and storing processing of data. The control device 1201 operates according to a program stored in the memory 1202.

The control device 1201 includes at least an event information acquisition unit 1209, a service provision content transmission unit 1210, and an autonomous driving control unit 1211 as functional (software) configurations that can be realized by execution of a program. Additional functional configurations may be provided depending on the equipment provided by the autonomous vehicle 903. For example, when the autonomous vehicle includes the cooking appliances 1207 and the display 1208, the functional configuration of the control device 1201 may include a cooking control unit 1212 and a display control unit 1213.

The event information acquisition unit 1209 acquires a service provision request including the event information sent from the server 901. The event information acquisition unit 1209 determines, based on the schedule data stored in the recording device 1204, whether or not the autonomous vehicle 903 is available at the date and time of the event included in the event information from the server 901.

When the event information acquisition unit 1209 obtains a determination result indicating that the autonomous vehicle 903 is available at the date and time of the event, the service provision content transmission unit 1210 transmits, to the server 901, service provision content information that can be realized in the autonomous vehicle 903 read from the recording device 1204, as a response to the service provision request.

The autonomous driving control unit 1211 is a known autonomous driving controller in which a control function of autonomous driving of the autonomous vehicle 903 is implemented. The autonomous driving control unit 1211 determines traveling of the autonomous vehicle 903 as an autonomous vehicle, based on the detection results of the GNSS receiver 1205 and the plurality of sensors 1206. The autonomous vehicle 903 moves by autonomous driving to the event venue designated by the server 901, and moves and stops in the event venue.

The cooking control unit 1212 instructs the cooking appliance 1207 to instruct cooking or preparation of food or drink to be provided by the autonomous vehicle 903 (shop vehicle 903A) as an outdoor restaurant during the event holding.

The display control unit 1213 generates menu information and image data corresponding to the menu information and causes display 1208 to display the menu information and image data.

<Configuration of Service Provider's Terminal>

Figure 13:
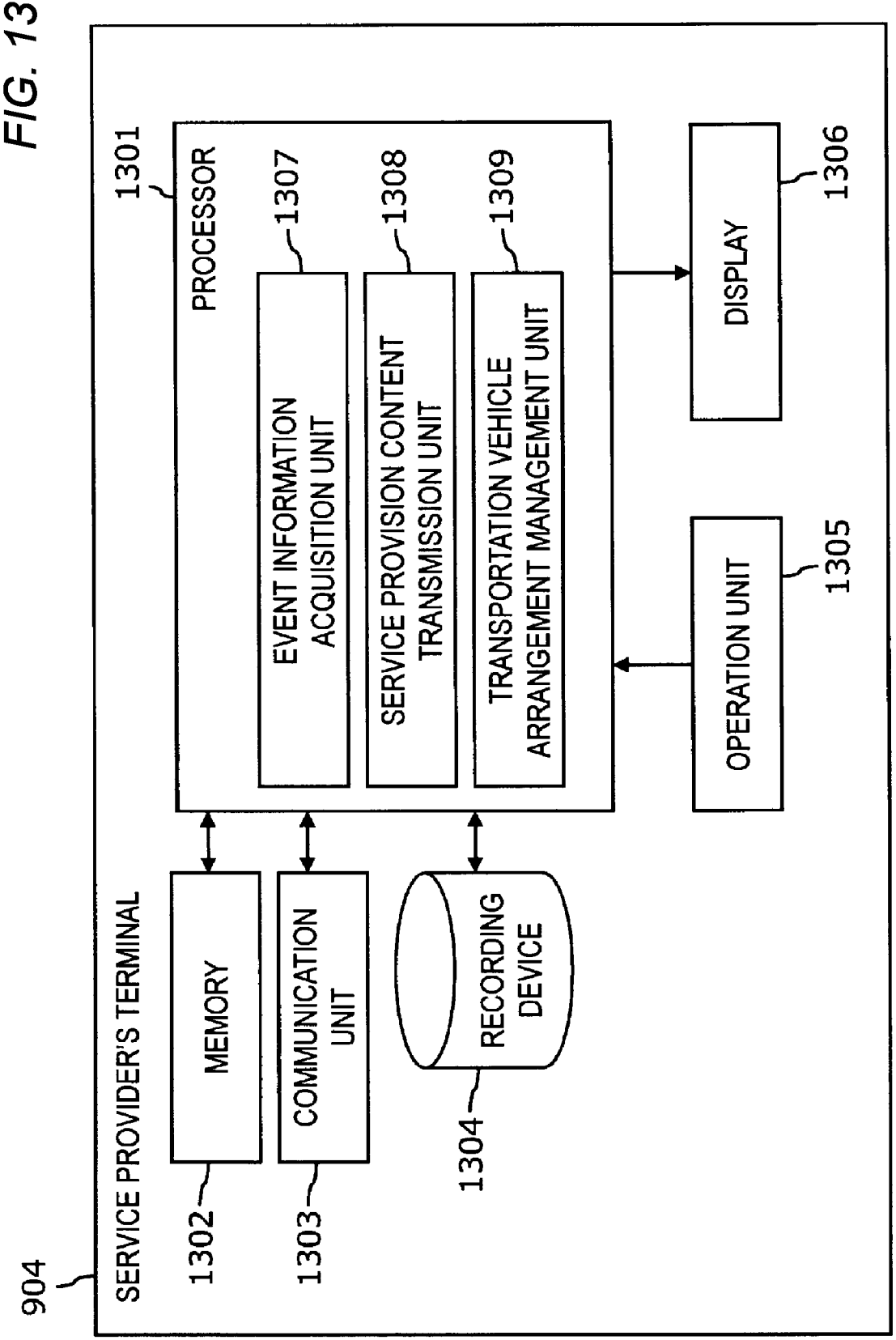
FIG. 13 shows a block diagram illustrating a configuration of a service provider's terminal illustrated in FIG. 9.

FIG. 13 is a block diagram illustrating the configuration of the service provider's terminal 904 illustrated in FIG. 9. The service provider's terminal 904 is configured to include a processor 1301, a memory 1302, a communication unit 1303, a recording device 1304, an operation unit 1305, and a display 1306.

The memory 1302 is configured by using a primary storage device (for example, a RAM, a ROM), and temporarily stores a program required for execution of an operation of the service provider's terminal 904, and further, data or information generated during the operation. The RAM is, for example, a work memory used when the processor 1301 operates. In the ROM, for example, a program for controlling the processor 1301 is stored in advance. The memory 1302 stores information of service provision contents that the service provider's terminal 904 can realize for the event holding.

The communication unit 1303 is configured by a communication circuit that communicates with the server 901 through the network 906. As a communication method by the communication unit 1303, for example, a wireless communication method such as WAN, LAN, WiFi (registered trademark), mobile communication for mobile phone, and the like corresponding to the network 906 is exemplified. For example, the communication unit 1303 receives event information transmitted from the server 901. The communication unit 1303 sends, to the server 901, information of the service provision contents in the service provider's terminal 904 delivered from the processor 1301.

The recording device 1304 is configured by using a secondary storage device (for example, an HDD or an SSD) or a tertiary storage device (for example, an optical disk or an SD card). The recording device 1304 stores information of service provision contents that the service provider's terminal 904 described above can realize for the event holding. For example, as the information on the service provision content, for example, information on the service provision content (described above) registered as a member in the server 901 is stored. The recording device 1304 stores schedule data indicating a daily reservation status (for example, availability for each month, day, and time zone) of the service provider managed by the service provider's terminal 904.

The operation unit 1305 receives an operation of the service provider, and delivers data or information input by the operation to the processor 1301.

The display 1306 is configured as, for example, an organic EL display or a liquid crystal display, and displays data or information delivered from the processor 1301.

The processor 1301 is configured by using, for example, a CPU, a DSP or an FPGA. The processor 1301 functions as a control unit of the service provider's terminal 904, and performs control processing to comprehensively control the overall operation of each unit of the service provider's terminal 904, input and output processing of data with each unit of the service provider's terminal 904, arithmetic processing of data, and storing processing of data. The processor 1301 operates according to a program stored in the memory 1302.

The processor 1301 includes at least an event information acquisition unit 1307, a service provision content transmission unit 1308, and a transportation vehicle arrangement management unit 1309 as functional (software) configurations that can be realized by execution of a program.

The event information acquisition unit 1307 acquires a service provision request including the event information sent from the server 901. The event information acquisition unit 1307 determines whether or not the service provider's schedule is available at the date and time of the event included in the recording device 1304.

When the event information acquisition unit 1307 obtains the determination result that the event venue 910 is available at the date and time of the event, the service provision content transmission unit 1308 sends, to the server 901, information on service provision contents that can be realized for the event holding read from the recording device 1304 as a response to the service provision request.

The transportation vehicle arrangement management unit 1309 generates a request (transportation vehicle request) for arranging (for example, inputting the date and time and place where transportation vehicle 903B arrives at the home of customer 950 and reservation of the transportation vehicle 903B) the transportation vehicle 903B to transport to the event venue, and sends the request to the server 901 through the communication unit 1303. When the transportation vehicle request is received, the server 901 arranges the transportation vehicle 903B corresponding to the request from the corresponding customer's terminal 905 with respect to an administrator terminal (not illustrated) of an operating company of the transportation vehicle 903B or the like.

<Configuration of Customer's Terminal>

Figure 14:
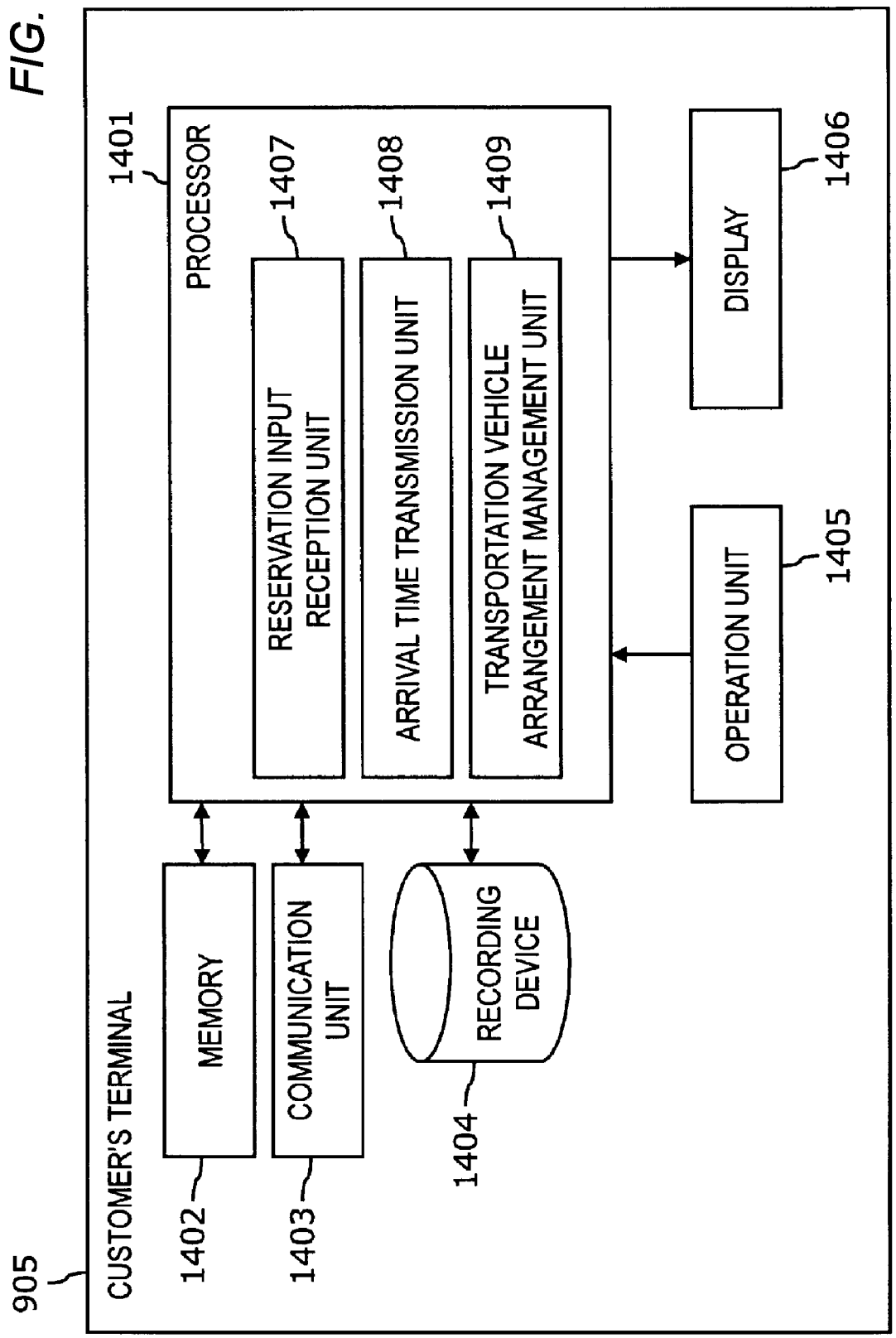
FIG. 14 shows a block diagram illustrating a configuration of a customer's terminal illustrated in FIG. 9.

FIG. 14 is a block diagram illustrating the configuration of the customer's terminal 905 illustrated in FIG. 9. The customer's terminal 905 is configured to include a processor 1401, a memory 1402, a communication unit 1403, a recording device 1404, an operation unit 1405, and a display 1406. The customer's terminal 905 is a terminal possessed by a customer registered as a member, and is configured by a smartphone or a computer such as a tablet terminal. Hereinafter, the smartphone will be described as an example.

The memory 1402 is configured by using a primary storage device (for example, RAM, ROM), and temporarily stores a program required for execution of an operation of the customer's terminal 905, and further, data or information generated during the operation. The RAM is, for example, a work memory used when the processor 1401 operates. In the ROM, for example, a program for controlling the processor 1401 is stored in advance.

The communication unit 1403 is configured by a communication circuit that communicates with server 901 through the network 906. As a communication method by the communication unit 1403, for example, a wireless communication method such as WAN, LAN, WiFi (registered trademark), mobile communication for mobile phone, and the like corresponding to the network 906 is exemplified. For example, the communication unit 1403 receives the event information transmitted from the server 901. The communication unit 1403 sends the event participation application delivered from the processor 1401 to the server 901.

The recording device 1404 is configured by using a secondary storage device (for example, an HDD or an SSD) or a tertiary storage device (for example, an optical disk or an SD card). The recording device 1404 may store the customer information described above.

The operation unit 1405 receives an operation of the customer 950 who is the owner of the customer's terminal 905, and delivers data or information input by the operation to the processor 1401.

The display 1406 is configured as, for example, an organic EL display or a liquid crystal display, and displays data or information delivered from the processor 1401. For example, the display 1406 displays event map data (see FIG. 17) delivered from the processor 1401.

The processor 1401 is configured by using, for example, a CPU, a DSP or an FPGA. The processor 1401 functions as a control unit of the customer's terminal 905, and performs control processing to comprehensively control the overall operation of each unit of the customer's terminal 905, input and output processing of data with each unit of the customer's terminal 905, arithmetic processing of data, and storing processing of data. The processor 1401 operates according to a program stored in the memory 1402.

The processor 1401 includes a reservation input reception unit 1407, an arrival time transmission unit 1408, and a transportation vehicle arrangement management unit 1409 as functional (software) configurations that can be realized by execution of a program.

The reservation input reception unit 1407 acquires event information including information on the place of the event venue sent from the server 901. The reservation input reception unit 1407 causes the display 1406 to display the event information. The reservation input reception unit 1407 generates an event participation application indicating a participation intention to participate in an event by the operation of the customer 950, and sends the event participation application to the server 901 through the communication unit 1403. The event participation application includes customer identification information.

The arrival time transmission unit 1408 generates scheduled time information for the customer 950 who is the owner of the customer's terminal 905 to arrive at the event venue (for example, the event venue 910) while the event is held, and sends the scheduled time information to the server 901 through the communication unit 1403. When the server 901 receives the scheduled time information for each customer, the server 901 stores the identification information of the customer 950 and the scheduled time information in the recording device 1004 in association with each other.

The transportation vehicle arrangement management unit 1409 generates a request (transportation vehicle request) for arranging (for example, inputting the date and time and place where transportation vehicle 903B arrives at the home of customer 950 and reservation of the transportation vehicle 903B) the transportation vehicle 903B to transport to the event venue, and sends the request to the server 901 through the communication unit 1403. When the transportation vehicle request is received, the server 901 arranges the transportation vehicle 903B corresponding to the request from the corresponding customer's terminal 905 with respect to an administrator terminal (not illustrated) of an operating company of the transportation vehicle 903B or the like.

<Server Operation>

Figure 15:
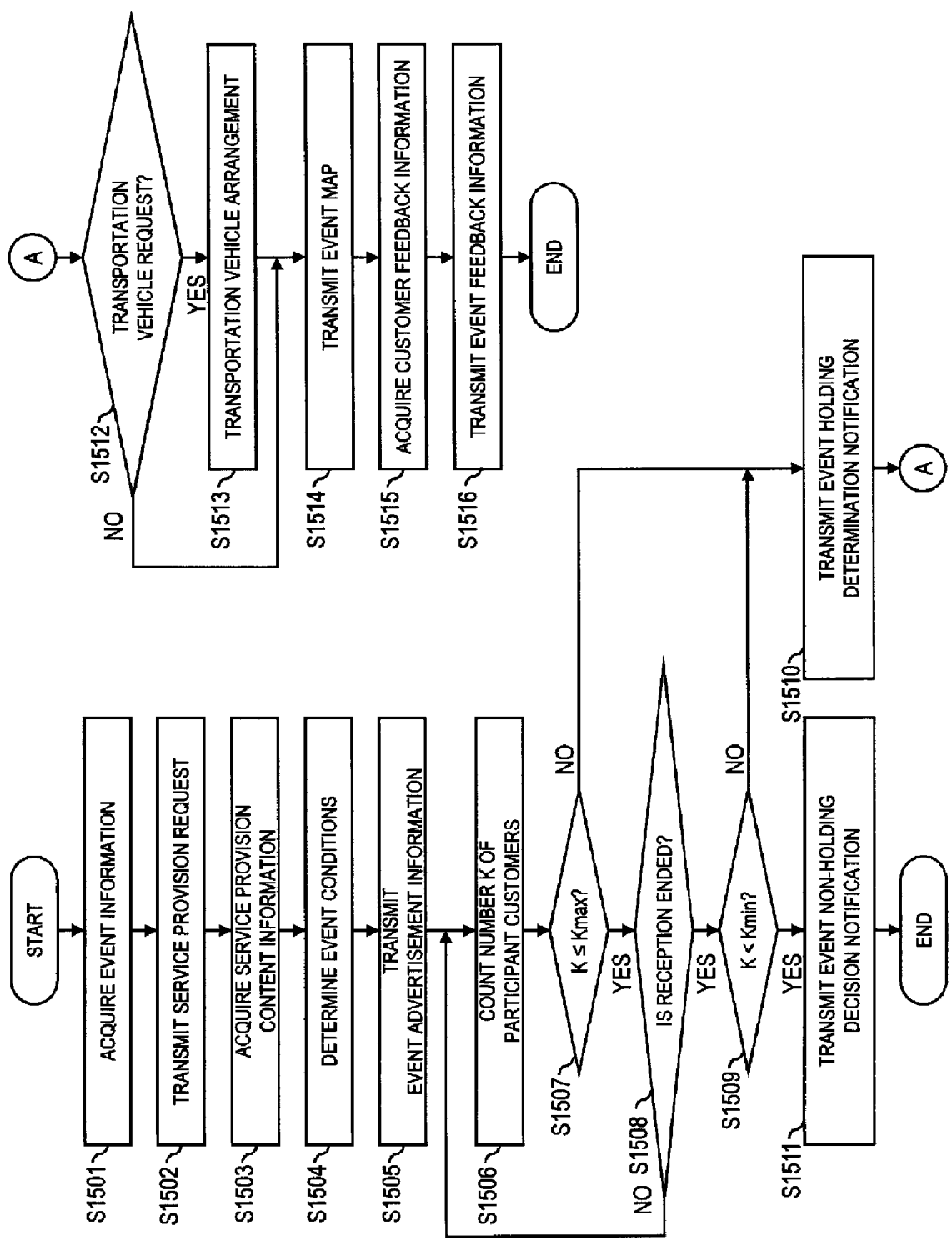
FIG. 15 shows a flowchart illustrating an operation procedure of a server illustrated in FIG. 9.

Next, an example of the operation procedure of the server 901 according to this embodiment will be described with reference to FIG. 15. FIG. 15 is a flowchart illustrating an operation procedure of the server 901 illustrated in FIG. 9. Each processing (step) indicated in FIG. 15 is mainly executed by the processor 1001 of the server 901.

First, the event reception unit 1005 acquires event information sent from the event organizer's terminal 902 through the communication unit 1003 (step S1501). This event information includes the contents of the event (for example, an outdoor restaurant) that the event organizer 920 does not possess enough assets for holding an event such as an outdoor restaurant wants to hold (for example, an outdoor restaurant), the date and time of the event (for example, start date and end date), the expected number of participant customers (for example, the minimum number and the maximum number for feasibility), the budget of the event, and the desired balance by holding the event. When the event organizer 920 is a customer and an approximate number of participant customers is secured, the budget alone may not be included in the event information for the balance. The event reception unit 1005 stores the acquired event information in the recording device 1004.

When the event reception unit 1005 receives the event information in step S1501, the service provider arrangement unit 1006 generates a service provision request including the received event information. The service provider arrangement unit 1006 refers to member information stored in the recording device 1004, and selects an autonomous vehicle and a service provider according to the event information. The selection of a service provider may also consider external factors such as expected weather conditions. Then, the service provider arrangement unit 1006 transmits the generated service provision request to the selected autonomous vehicle and service provider (in this embodiment, the shop vehicle 903A, the cook's terminal 904A, the food provider's terminal 904B, and the place provider's terminal 904C) through the communication unit 1003 (step S1502).

When the shop vehicle 903A, the cook's terminal 904A, the food provider's terminal 904B, and the place provider's terminal 904C transmit service provision content information as a response to the service provision request transmitted in step S1502, the service provider arrangement unit 1006 acquires the transmitted service provision content information through the communication unit 1003 (step S1503). The service provider arrangement unit 1006 adds information on the arranged autonomous vehicle and the service provider to the event information stored in the recording device 1004 and stores the information.

When the service provider arrangement unit 1006 acquires the service provision content information in step S1503, the event condition decision unit 1007 determines the event conditions including the minimum number of people performing business and the maximum number of people performing business, the reception deadline of the event participation application, and the event participation privilege (step S1504). The condition designated in the event information acquired from the event organizer 920 may be set for the event condition, or the event condition may be set according to the service provision content information acquired in step S1503. The event condition decision unit 1007 stores the determined event condition in the memory 1002 and adds the determined event condition to the event information stored in the recording device 1004 and stores the determined event condition.

The event condition decision unit 1007 generates event advertisement information based on the event information acquired in S101, the service provision content information acquired in S102, and at least a part (for example, event participation privilege) of the event conditions determined in S103. Then, the event condition decision unit 1007 transmits the generated event advertisement information to the customer's terminal 905 registered as a member through the communication unit 1003(step S1505). The event condition decision unit 1007 may refer to member information stored in the recording device 1004 or refer to position information of the customer's terminal 905 to select the customer's terminal 905 serving as a transmission destination of the event advertisement information. For example, in a case where the event venue is in a densely populated area, when the event advertisement information is transmitted to all of the registered customer's terminals 905, there may be too many customers 950 who want to participate in the event. In this case, the number of customer's terminals 905 serving as the transmission destination of the event advertisement information may be limited.

When event advertisement information is transmitted in step S1505, the event condition determination unit 1008 starts receiving the event participation application from the customer's terminal 905. When the event participation application is received from the customer's terminal 905, the event condition determination unit 1008 stores the event participation application in the memory 1002. Then, the event condition determination unit 1008 counts the number of event participation applications received, that is, the number K of participant customers (step S1506).

The event condition determination unit 1008 determines whether or not the number K of participant customers counted in step S1506 is equal to or less than the maximum number of people performing business Kmax (step S1507), and when it is determined that the number K of participant customers exceeds the maximum number of people performing business Kmax (NO in S107), the process proceeds to step S1510. When it is determined that the number K of participant customers is equal to or less than the maximum number of people performing business Kmax (YES in S107), the event condition determination unit 1008 refers to the reception deadline of the event participation application under the event condition stored in the memory 1002, and determines whether or not the reception of the event participation application is to be ended (step S1508). When it is determined that the reception of the event participation application is not to be ended (step S1508: NO), the process returns to step S1506.

When it is determined that the reception of the event participation application is to be ended (YES in step S1508), the event condition determination unit 1008 determines whether or not the number K of participant customers is less than the minimum number of people performing business Kmin (step S1509).

When it is determined that the number K of participant customers is equal to or greater than the minimum number of people performing business Kmin (NO in step S1509) or when it is determined that the number K is greater than the maximum number Kmax of people (NO in step S1507), the event condition determination unit 1008 determines that an event can be held, and generates event holding determination notification. The event condition determination unit 1008 transmits the generated event holding determination notification, through the communication unit 1003, to the event organizer's terminal 902, the shop vehicle 903A, the cook's terminal 904A, the food provider's terminal 904B, the place provider's terminal 904C, and the customer's terminal 905 that transmits event participation application, and ends the reception of the event participation application (step S1510). The event condition determination unit 1008 includes final event information in the event holding determination notification to be transmitted to the event organizer's terminal 902. Privilege information (contents of the privilege and image information for receiving specification) is included in the event holding determination notification transmitted to the customer's terminal 905 of the customer to whom the event participation privilege is given.

On the other hand, when it is determined that the number K of participant customers is less than the minimum number of people performing business Kmin (YES in step S1509), the event condition determination unit 1008 determines that an event cannot be held, and generates event non-holding decision notification. The event condition determination unit 1008 transmits the generated event non-holding decision notification, through the communication unit 1003, to the event organizer's terminal 902, the shop vehicle 903A, the cook's terminal 904A, the food provider's terminal 904B, and the place provider's terminal 904C, and the customer's terminal 905 (a customer's terminal serving as a transmission destination of the event advertisement information, or a customer's terminal that has transmitted an event participation application), and ends the reception of the event participation application (step S1511).

The event condition determination unit 1008 adds the customer information of the customer 950 who owns the customer's terminal 905 that has transmitted the event participation application and the determination result on whether the event is held or not held to the event information recorded in the recording device 1004 and stores the customer information. In the following description, the event holding determination notification and the event holding non-determination notification may be collectively referred to as event determination notification.

The service provider arrangement unit 1006 determines whether or not a request for a transportation vehicle has been received from at least one of the service provider's terminal 904 (the cook's terminal 904A and the food provider's terminal 904B) and the customer's terminal 905 (step S1512), and when it is determined that the transportation vehicle request is received (YES in step S1512), the service provider arrangement unit 1006 arranges the transportation vehicle 903B (step S1513).

When it is determined that an event is to be held, the event map data generation unit 1009 generates event map data indicating a placement location of the shop vehicle 903A of event venue 910 on the day of the event. The event map data may be generated according to the layout designated by the event organizer 920, or may be generated by the event map data generation unit 1009 determining the layout. The shop vehicle 903A may stop at an arbitrary position of the event venue 910 on the day of the event, and may generate event map data based on position information of the shop vehicle 903A. The event map data generation unit 1009 transmits the generated the event map to the event organizer's terminal 902, the shop vehicle 903A, the transportation vehicle 903B (when a transportation vehicle request is received from the service provider or the customer), the cook's terminal 904A, the food provider's terminal 904B, the place provider's terminal 904C, and the customer's terminal 905 that has transmitted the event participation application (step S1514). The event map data may be transmitted to at least the customer's terminal 905.

The feedback information generation unit 1010 acquires customer feedback information transmitted from the customer's terminal 905 during event holding or after event holding (step S1515). As a method for acquiring the customer feedback information, there is a method in which the feedback information generation unit 1010 generates questionnaire information and transmits it to the customer's terminal 905 that has transmitted an event participation application, and acquires the questionnaire returned by the customer's terminal 905. Examples of the contents of the customer feedback information include evaluation (satisfaction with food and drink offered, price setting, and impression of customer service) for the shop vehicle 903A, evaluation (satisfaction with location conditions and equipment in the event venue) for the event venue, and the like.

The feedback information generation unit 1010 reads event information (event information to which event conditions, information on the arranged autonomous vehicles and service providers who arranged, customer information applied for event participation and determination result of holding or non-holding of event are added) from the recording device 1004. Then, the feedback information generation unit 1010 adds the customer feedback information and the external factors (weather condition, traffic condition around the event venue, and the like) at the time of holding the event to the read event information to generate event feedback information. Then, the feedback information generation unit 1010 transmits the generated event feedback information to the event organizer's terminal 902 through the communication unit 1003 (step S1516).

<Operation of Event Holding Support System>

Figure 16:
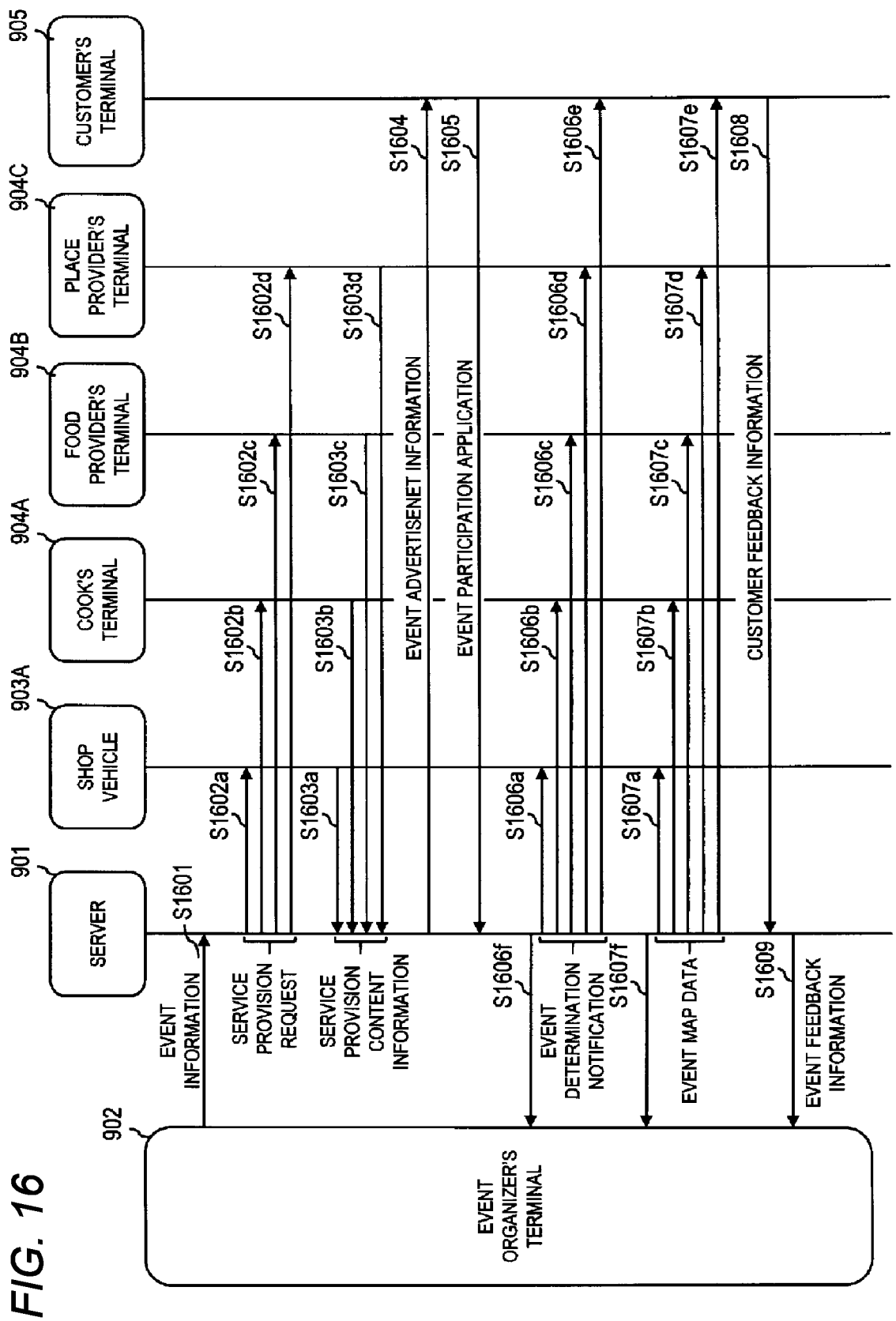
FIG. 16 shows a sequence diagram illustrating an operation procedure of the event holding support system illustrated in FIG. 9.

Next, an example of an operation procedure of the event holding support system 900 according to this embodiment will be described with reference to FIG. 16. FIG. 16 is a sequence diagram illustrating an operation procedure of the event holding support system illustrated in FIG. 9.

First, the event organizer's terminal 902 transmits event information to the server 901 (step S1601).

When the event information is received from event organizer's terminal 902, the server 901 transmits a service provision request including the event information to each of the selected shop vehicle 903A, the cook's terminal 904A, the food provider's terminal 904B, and the place provider's terminal 904C (steps S1602a, S1602b, S1602c, and S1602d).

Each of the shop vehicle 903A, the cook's terminal 904A, the food provider's terminal 904B, and the place provider's terminal 904C sends service provision content information that can be realized in each of the shop vehicle 903A and terminals 904A, 904B, and 904C to the server 901 as a response to the service provision request (steps S1603a, S1603b, S1603c, and S1603d).

The server 901 transmits, to the customer's terminal 70, the event advertisement information generated based on the event information acquired in step S1601 and the service provision content information acquired in steps S1603a, S1603b, S1603c, and S1603d (step S1604). The customer's terminal 905 sends an event participation application indicating an intention to participate in the event to the server 901 by the operation of the customer 950 who is willing to participate in the event among the customers who browsed the event advertisement information (step S1605).

The server 901 determines whether or not to hold the event based on the number of event participation applications (in other words, the number of event participant customers) acquired in step S1605, and sends the event determination notification indicating the determination result to each of the shop vehicle 903A, the cook's terminal 904A, the food provider's terminal 904B, the place provider's terminal 904C, the customer's terminal 905, and the event organizer's terminal 902 (steps S1606a, S1606b, S1606c, S1606d, S1606e, and S1606f).

Before event holding or on the day of the event, the server 901 generates event map data, and sends to event map data to each of the shop vehicle 903A, the cook's terminal 904A, the food provider's terminal 904B, the place provider's terminal 904C, the customer's terminal 905, and the event organizer's terminal 902 (steps S1607a, S1607b, S1607c, S1607d, S1607e, and S1607f).

During event holding or after event holding, the customer's terminal 905 sends customer feedback information on the contents of the event to the server 901 (step S1608).

The server 901 generates event feedback information based on the event information and the customer feedback information acquired in step S1608, and sends the event feedback information to the event organizer's terminal 902 (step S1609).

Figure 17:
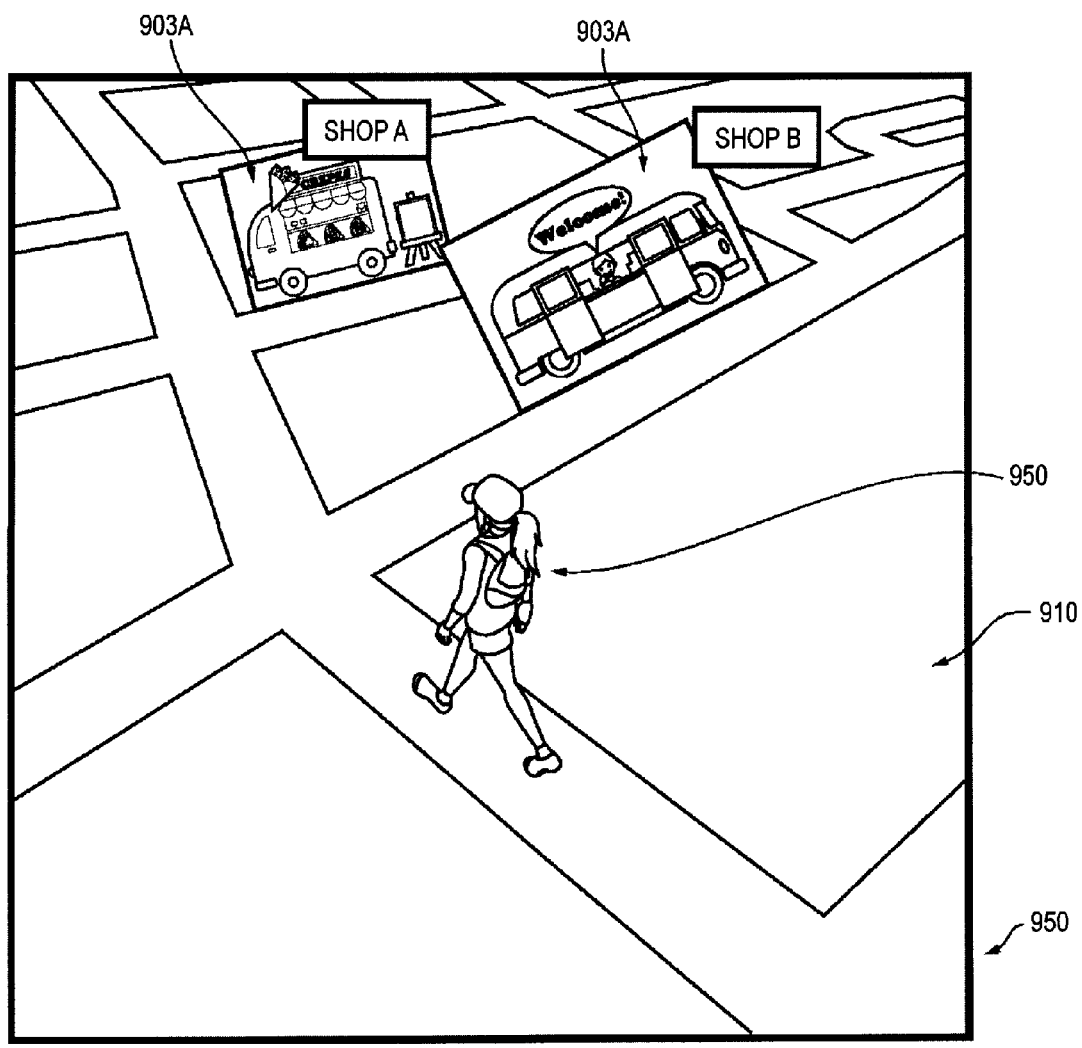
FIG. 17 shows a diagram illustrating an example of an event map displayed on a customer's terminal.

FIG. 17 is a diagram illustrating an example of an event map displayed on the customer's terminal 905. As illustrated in FIG. 17, the event map is displayed on the display 1406 of the customer's terminal 905. In this example, based on the event map data received from the server 901, a person model of the customer 950 (for example, a woman in FIG. 17) is displayed using the position information of the customer's terminal 905. Thus, the customer 950 can easily grasp the position of the shop vehicle 903A by viewing the event map including the person model of the customer 950 (the current position of the customer 950) and an image showing the placement location of the shop vehicle 903A in the event venue 910 while walking in the event venue 910.

<Summarization>

The event holding support system according to this embodiment arranges the autonomous vehicle, the service provider and the customer according to the desired event condition with the push notification, and thus it is possible for an individual or a small-scale entrepreneur who does not have an asset to quickly (for example, on the day of the event) hold an event by drawing up prospects for attracting customers and balances. A service provider such as a gig worker can effectively use free time. In addition, the customer can hold an event according to a desired event condition.

Furthermore, in the event holding support system of this embodiment, since an autonomous vehicle and a service provider registered as members are selected based on event information, it is possible to propose an event based on a combination of new service elements that cannot be conceived by the event organizer, in keeping with wishes of the event organizer.

In the event holding support system of this embodiment, service provision contents of event, event holding result (number of event participant customers, revenue, and the like), external factors (weather condition, traffic condition around the event venue, and the like), event feedback information based on customer feedback information and the like are provided to an event organizer, and thus the event organizer can judge a high possibility of holding the event and conditions of high customer attraction, high balance, and high customer satisfaction by examining the combination of information shown in the event feedback information and repeat the event having good conditions. That is, in the event holding support system, new needs can be transmitted to the event organizer.

Thus, according to the event holding support system 900 of this present embodiment, it is possible to quickly support holding of an event even by an individual or a small-scale entrepreneur and to satisfy the needs of an event organizer, a service provider, and a customer.

Modification Example

Although various embodiments have been described above with reference to the drawings, it goes without saying that the present disclosure is not limited to such examples.

It is obvious that those skilled in the art can conceive of various modifications, alterations, replacements, additions, deletions, and equivalents within the scope of the claims, and it is naturally understood that those belong to the technical scope of the present disclosure. Each component in various embodiments described above may be arbitrarily combined in the range without departing from the gist of invention.

In this embodiment, as a service element of an event, a case of combination of an autonomous vehicle and a service provider who does not use the autonomous vehicle has been described, but only one of the autonomous vehicle and the service provider may be used. That is, the service of the event may be provided only by the autonomous vehicle, or the service of the event may be provided only by the service provider who does not use the autonomous vehicle.

In this embodiment, although the case where the shop vehicle and the transportation vehicle are used as the autonomous vehicle and the cook, the food provider and the place provider are used as the service provider has been described, the service element which constitutes an event is not limited thereto, and various service elements can be used.

In this embodiment, an example has been described in which the autonomous vehicle or the service provider's terminal responds to the service provision request with reference to schedule data stored in its own device. However, the autonomous vehicle or the service provider's terminal may disclose the schedule data to the server, and the server may select the autonomous vehicle or the service provider with reference to the schedule data.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a system to enable autonomous vehicles to take part in a gig economy, whereby vehicles may complete tasks on behalf of a (temporary) employer, and that employer may verify that the vehicle is capable of the task using its various on-board technologies, is provided.

According to an aspect of the present disclosure, a method for generating and fulfilling a work task via a modular autonomous vehicle is provided. The method includes transmitting, from a computing device and to a server, a work task request specifying a work request to be performed by the modular autonomous vehicle; identifying, by the server, equipment required for performing the work task request; accessing, by the modular autonomous vehicle, information of the equipment required for performing the work task request; determining, by the server, whether equipment of the modular autonomous vehicle corresponds to the equipment required for performing the work task request; when the equipment of the modular autonomous vehicle is determined to correspond to the equipment required for performing the work task request, requesting, by the server and from the modular autonomous vehicle, in-cabin sensing data of the modular autonomous vehicle; assigning or denying, by the server, the work task to the modular autonomous vehicle based on the in-cabin sensing data; and when the work task is assigned to the modular autonomous vehicle, performing, by the modular autonomous vehicle, the work task as specified in the work task request.

According to another aspect of the present disclosure, the equipment of the modular autonomous vehicle is currently installed equipment.

According to another aspect of the present disclosure, the equipment of the modular autonomous vehicle is available equipment configured to be installed.

According to another aspect of the present disclosure, the modular autonomous vehicle includes a driving part and a modular part.

According to yet another aspect of the present disclosure, the modular part is configured to be swapped out with another modular part including different equipment.

According to still another aspect of the present disclosure, the equipment of the modular autonomous vehicle is driven by an actuator.

According to another aspect of the present disclosure, the equipment of the modular autonomous vehicle is a detachable fixture.

According to another aspect of the present disclosure, the method further includes receiving, at the modular autonomous vehicle and from a passenger device, a transport request; displaying, on a display of the passenger device, a list of variable fare rates and corresponding arrival time tolerances; receiving, on the passenger device, a selection of one of the variable fare rates; and modifying, by the modular autonomous vehicle, a schedule of the modular autonomous vehicle based on an arrival time tolerance corresponding to the selection of the variable fare rate.

According to yet another aspect of the present disclosure, the server stores a plurality of work tasks, and the work tasks are filtered for selection by the modular autonomous vehicle based on the equipment of the modular autonomous vehicle.

According to still another aspect of the present disclosure, the work task request specifies at least one of a location, mandatory equipment information, preferred equipment information and duration.

According to a further aspect of the present disclosure, the work task request is automatically generated based on historical data.

According to another aspect of the present disclosure, the method further includes determining an amount of time required for performing the work task; and determining whether a schedule of the modular autonomous vehicle allows performance of the work task based on the amount of time required.

According to another aspect of the present disclosure, the method further includes when the schedule of the modular autonomous vehicle does not allow the work task to be performed by the modular autonomous vehicle, modifying the schedule of the modular autonomous vehicle.

According to yet another aspect of the present disclosure, the schedule of the modular autonomous vehicle is modified by offering a variable fare for a transportation request received by the modular autonomous vehicle.

According to still another aspect of the present disclosure, the method further includes determining, by the server, whether a manual component is specified in the work task request; when the manual component is determined to be specified, identifying, by the server, a skill set required for performing the manual component; identifying, by the server, a gig worker having the skill set required; transmitting, by the server to the gig worker, a request to perform the manual component specified in the work task; receiving, at the server and from the gig worker, an acceptance to perform the manual component specified in the work task; and assigning, by the server and the gig worker, the manual component specified in the work task.

According to another aspect of the present disclosure, the method further includes identifying a location of the gig worker; and modifying, by the modular autonomous vehicle, a travel route to coincide with the location of the gig worker.

According to another aspect of the present disclosure, the in-cabin sensing data includes image data captured by an in-cabin camera.

According to yet another aspect of the present disclosure, the modular autonomous vehicle is configured to provide at least one of a hotel service, a food service and a beverage service.

According to another aspect of the present disclosure, a non-transitory computer readable storage medium that stores a computer program, the computer program, when executed by a processor, causing a computer apparatus to perform a process for generating and fulfilling a work task via a modular autonomous vehicle is provided. The process includes transmitting, from a computing device and to a server, a work task request specifying a work request to be performed by the modular autonomous vehicle; identifying, by the server, equipment required for performing the work task request; accessing, by the modular autonomous vehicle, information of the equipment required for performing the work task request; determining, by the server, whether equipment of the modular autonomous vehicle corresponds to the equipment required for performing the work task request; when the equipment of the modular autonomous vehicle is determined to correspond to the equipment required for performing the work task request, requesting, by the server and from the modular autonomous vehicle, in-cabin sensing data of the modular autonomous vehicle; assigning or denying, by the server, the work task to the modular autonomous vehicle based on the in-cabin sensing data; and when the work task is assigned to the modular autonomous vehicle, performing, by the modular autonomous vehicle, the work task as specified in the work task request.

According to yet another aspect of the present disclosure, a computer apparatus for generating and fulfilling a work task via a modular autonomous vehicle is provided. The computer apparatus includes a memory that stores instructions, and a processor that executes the instructions, in which, when executed by the processor, the instructions cause the processor to perform a set of operations. The set of operations includes transmitting, from a computing device and to a server, a work task request specifying a work request to be performed by the modular autonomous vehicle; identifying, by the server, equipment required for performing the work task request; accessing, by the modular autonomous vehicle, information of the equipment required for performing the work task request; determining, by the server, whether equipment of the modular autonomous vehicle corresponds to the equipment required for performing the work task request; when the equipment of the modular autonomous vehicle is determined to correspond to the equipment required for performing the work task request, requesting, by the server and from the modular autonomous vehicle, in-cabin sensing data of the modular autonomous vehicle; assigning or denying, by the server, the work task to the modular autonomous vehicle based on the in-cabin sensing data; and when the work task is assigned to the modular autonomous vehicle, performing, by the modular autonomous vehicle, the work task as specified in the work task request.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The present application claims the benefit of U.S. Provisional Patent Application No. 62/735,339 filed on Sep. 24, 2018. The entire disclosure of the above-identified application, including the specifications, drawings and/or claims, is incorporated herein by reference in its entirety.

The invention claimed is:

1. A method for generating and fulfilling a work task via a modular autonomous vehicle, the method comprising:
   transmitting, from a computing device and to a server, a work task request specifying a work request to be performed by the modular autonomous vehicle;
   identifying, by the server, equipment required for performing the work task request;
   accessing, by the modular autonomous vehicle, information of the equipment required for performing the work task request;
   determining, by the server, whether equipment of the modular autonomous vehicle corresponds to the equipment required for performing the work task request;
   when the equipment of the modular autonomous vehicle is determined to correspond to the equipment required for performing the work task request, requesting, by the server and from the modular autonomous vehicle, in-cabin sensing data of the modular autonomous vehicle;
   assigning or denying, by the server, the work task to the modular autonomous vehicle based on the in-cabin sensing data;
   when the work task is assigned to the modular autonomous vehicle, performing, by the modular autonomous vehicle, the work task as specified in the work task request,
   receiving, at the modular autonomous vehicle and from a passenger device, a transport request;
   displaying, on a display of the passenger device, a list of variable fare rates and corresponding arrival time tolerances;
   receiving, on the passenger device, a selection of one of the variable fare rates;
   modifying, by the modular autonomous vehicle, a schedule of the modular autonomous vehicle based on an arrival time tolerance corresponding to the selection of the one of the variable fare rates; and
   analyzing, by the server, the work task request and the transport request to identify any flexibility in specifications, which allow both to be completed without conflict.

2. The method of claim 1, wherein the equipment of the modular autonomous vehicle is currently installed equipment.

3. The method of claim 1, wherein the equipment of the modular autonomous vehicle is available equipment configured to be installed.

4. The method of claim 1, wherein the modular autonomous vehicle includes a driving part and a modular part.

5. The method of claim 4, wherein the modular part is configured to be swapped out with another modular part including different equipment.

6. The method of claim 1, wherein the equipment of the modular autonomous vehicle is driven by an actuator.

7. The method of claim 1, wherein the equipment of the modular autonomous vehicle is a detachable fixture.

8. The method of claim 1, wherein the server stores a plurality of work tasks, and the work tasks are filtered for selection by the modular autonomous vehicle based on the equipment of the modular autonomous vehicle.

9. The method of claim 1, wherein the work task request specifies at least one of a location, mandatory equipment information, preferred equipment information and duration.

10. The method of claim 1, wherein the work task request is automatically generated based on historical data.

11. The method of claim 1, further comprising:
   determining an amount of time required for performing the work task; and
   determining whether the schedule of the modular autonomous vehicle allows performance of the work task based on the amount of time required.

12. The method of claim 11, further comprising:
   when the schedule of the modular autonomous vehicle does not allow the work task to be performed by the modular autonomous vehicle, modifying the schedule of the modular autonomous vehicle.

13. The method of claim 12, wherein the schedule of the modular autonomous vehicle is modified by offering a variable fare for a transportation request received by the modular autonomous vehicle.

14. The method of claim 1, further comprising:
   determining, by the server, whether a manual component is specified in the work task request;
   when the manual component is determined to be specified, identifying, by the server, a skill set required for performing the manual component;
   identifying, by the server, a gig worker having the skill set required;
   transmitting, by the server to the gig worker, a request to perform the manual component specified in the work task;
   receiving, at the server and from the gig worker, an acceptance to perform the manual component specified in the work task; and
   assigning, by the server and the gig worker, the manual component specified in the work task.

15. The method of claim 14, further comprising:
   identifying a location of the gig worker; and
   modifying, by the modular autonomous vehicle, a travel route to coincide with the location of the gig worker.

16. The method of claim 1, wherein the in-cabin sensing data includes image data captured by an in-cabin camera.

17. The method of claim 1, wherein the modular autonomous vehicle is configured to provide at least one of a hotel service, a food service and a beverage service.

18. A non-transitory computer readable storage medium that stores a computer program, the computer program, when executed by a processor, causing a computer apparatus to perform a process for generating and fulfilling a work task request via a modular autonomous vehicle, the process comprising:
   transmitting, from a computing device and to a server, a work task request specifying a work request to be performed by the modular autonomous vehicle;
   identifying, by the server, equipment required for performing the work task request;
   accessing, by the modular autonomous vehicle, information of the equipment required for performing the work task request;

determining, by the server, whether equipment of the modular autonomous vehicle corresponds to the equipment required for performing the work task request;

when the equipment of the modular autonomous vehicle is determined to correspond to the equipment required for performing the work task request, requesting, by the server and from the modular autonomous vehicle, in-cabin sensing data of the modular autonomous vehicle;

assigning or denying, by the server, the work task to the modular autonomous vehicle based on the in-cabin sensing data;

when the work task is assigned to the modular autonomous vehicle, performing, by the modular autonomous vehicle, the work task as specified in the work task request;

receiving, at the modular autonomous vehicle and from a passenger device, a transport request;

displaying, on a display of the passenger device, a list of variable fare rates and corresponding arrival time tolerances;

receiving, on the passenger device, a selection of one of the variable fare rates;

modifying, by the modular autonomous vehicle, a schedule of the modular autonomous vehicle based on an arrival time tolerance corresponding to the selection of the one of the variable fare rates; and analyzing, by the server, the work task request and the transport request to identify any flexibility in specifications, which allow both to be completed without conflict.

19. A computer apparatus for fulfilling a work task request via a modular autonomous vehicle, the computer apparatus comprising:

a memory that stores instructions, and a processor that executes the instructions, wherein, when executed by the processor, the instructions cause the processor to perform operations, the operations comprising:

transmitting, from a computing device and to a server, a work task request specifying a work request to be performed by the modular autonomous vehicle;

identifying, by the server, equipment required for performing the work task request;

accessing, by the modular autonomous vehicle, information of the equipment required for performing the work task request;

determining, by the server, whether equipment of the modular autonomous vehicle corresponds to the equipment required for performing the work task request;

when the equipment of the modular autonomous vehicle is determined to correspond to the equipment required for performing the work task request, requesting, by the server and from the modular autonomous vehicle, in-cabin sensing data of the modular autonomous vehicle;

assigning or denying, by the server, the work task to the modular autonomous vehicle based on the in-cabin sensing data;

when the work task is assigned to the modular autonomous vehicle, performing, by the modular autonomous vehicle, the work task as specified in the work task request;

receiving, at the modular autonomous vehicle and from a passenger device, a transport request;

displaying, on a display of the passenger device, a list of variable fare rates and corresponding arrival time tolerances;

receiving, on the passenger device, a selection of one of the variable fare rates;

modifying, by the modular autonomous vehicle, a schedule of the modular autonomous vehicle based on an arrival time tolerance corresponding to the selection of the one of the variable fare rates; and analyzing, by the server, the work task request and the transport request to identify any flexibility in specifications, which allow both to be completed without conflict.

* * * * *